(12) United States Patent
Alfaro

(10) Patent No.: US 12,552,530 B1
(45) Date of Patent: Feb. 17, 2026

(54) VERTICAL TAKE-OFF AND LANDING AIRCRAFT AND METHODS OF TAKING-OFF, LANDING, HIGH SPEED FLIGHT, AND AIRCRAFT CONTROL

(71) Applicant: Reynaldo Thomas Alfaro, Tehachapi, CA (US)

(72) Inventor: Reynaldo Thomas Alfaro, Tehachapi, CA (US)

( * ) Notice: Subject to any disclaimer, the term of this patent is extended or adjusted under 35 U.S.C. 154(b) by 0 days.

(21) Appl. No.: 18/909,392

(22) Filed: Oct. 8, 2024

Related U.S. Application Data

(60) Provisional application No. 63/590,400, filed on Oct. 13, 2023.

(51) Int. Cl.
*B64C 29/00* (2006.01)
*B64D 27/33* (2024.01)
*B64D 27/355* (2024.01)

(52) U.S. Cl.
CPC .......... *B64C 29/0033* (2013.01); *B64D 27/33* (2024.01); *B64D 27/355* (2024.01)

(58) Field of Classification Search
CPC .. B64C 29/0033; B64D 27/33; B64D 27/355; B64D 27/02
See application file for complete search history.

(56) References Cited

U.S. PATENT DOCUMENTS

| | | |
|---|---|---|
| D763,733 S | 8/2016 | Topcon |
| D799,402 S | 10/2017 | Cummings |
| D813,143 S | 3/2018 | Belik |
| D816,583 S | 5/2018 | Dutertre |
| D824,804 S | 8/2018 | Tian |
| 10,293,914 B2 | 5/2019 | Lilium |
| D874,382 S | 2/2020 | Lilium |
| 10,597,133 B2 | 3/2020 | Lilium |
| 11,072,423 B1 * | 7/2021 | Robertson ............... B64C 21/08 |
| 11,597,509 B1 | 3/2023 | Alfaro |

(Continued)

OTHER PUBLICATIONS

Lilium Jet, EVTOL News, Jul. 18, 2020, https://evtol.news/lilium/.

(Continued)

*Primary Examiner* — Rodney A Bonnette
(74) *Attorney, Agent, or Firm* — Nemphos Braue LLC; Michael Antone

(57) ABSTRACT

An aircraft that closely integrates thrust and aerodynamics to achieve VTOL flight, high speed forward flight, and smooth transitions from VTOL to forward flight. The invention combines Electric Ducted Rotors, Pivoting Angled Ducts, Ducted Column Assemblies, and Ventral Control Door assemblies for VTOL and high speed forward flight of an aircraft. In forward flight, the concept uses a plurality of Ducted Rotors arranged in columns to not only provide thrust, but also enhance aerodynamic lift. In VTOL flight and transitioning to forward flight, the PADs in a single Ducted Column Assembly rotate in unison in the pitch axis to create a single thrust vector through the Ventral Control Door Assembly, providing smooth power, controllability, and aircraft orientation throughout transition. Throughout all phases of flight, differential actuation of Electric Ducted Rotors and conventional flight controls provide control.

20 Claims, 29 Drawing Sheets

(56) References Cited

U.S. PATENT DOCUMENTS

| | | | |
|---|---|---|---|
| 2016/0023754 A1* | 1/2016 | Wiegand | B64D 27/32 |
| | | | 244/17.11 |
| 2016/0288903 A1 | 10/2016 | Rothhaar | |
| 2016/0311522 A1 | 10/2016 | Wiegand | |
| 2018/0201369 A1* | 7/2018 | Johnson | B64C 11/001 |
| 2019/0217937 A1 | 7/2019 | Wiegand | |
| 2019/0263515 A1 | 8/2019 | Karem | |
| 2020/0085988 A1 | 3/2020 | Vondrell | |
| 2021/0245876 A1* | 8/2021 | Bianco Mengotti | B64U 10/25 |
| 2024/0300644 A1* | 9/2024 | Taylor | B64C 39/06 |
| 2024/0409209 A1* | 12/2024 | Moore | B64C 15/12 |

OTHER PUBLICATIONS

An introduction to the Lilium Jet, Lilium, May 15, 2019_https://lilium.com/newsroom-detail/youve-never-seen-anything-like-this-an-introduction-to-the-lilium-jet.

* cited by examiner

VERTICAL TAKE-OFF AND LANDING AIRCRAFT AND METHODS OF TAKING-OFF, LANDING, HIGH SPEED FLIGHT, AND AIRCRAFT CONTROL

CROSS-REFERENCE TO RELATED APPLICATIONS

This application claims the benefit of and priority to U.S. Provisional Patent Application No. 63/590,400 filed Oct. 13, 2023, the disclosure of which is incorporated herein by reference in its entirety.

STATEMENT REGARDING FEDERALLY SPONSORED RESEARCH OR DEVELOPMENT

Not Applicable

BACKGROUND OF THE INVENTION

Field of the Invention

The disclosed invention relates generally to aircraft, and more particularly to Vertical Take-Off and Landing ("VTOL") aircraft with efficient high speed forward flight, to include transitions therebetween. In this disclosed invention, high speed forward flight is defined as no less than 200 knots indicated airspeed (KIAS).

Background

Historically, aircraft have been divided into two classes: aircraft that provide efficient forward flight, but require runways for take-off and landing, and vertical take-off and landing (VTOL) aircraft, such as helicopters, that do not require runways. Propeller driven or jet aircraft utilize unidirectional thrust for propulsion and wings for lift, which minimizes drag and improves forward flight speed and efficiency. Helicopters offer efficient VTOL but are encumbered by severe drag and low airspeed in forward flight. A small number of shaft-driven tilt-rotor aircraft have demonstrated acceptable performance for a limited number of applications but pay a significant penalty in weight and complexity. In addition, a small number of aircraft with a simpler tilt-wings or a partial tilt-wing mechanism, or electrical power systems utilizing either open propellers or ducted rotors, have shown some improvement in performance for VTOL flight, but forward airspeeds remain similar to that of helicopters in the same weight class. As such, there is a continuing need for aircraft with improved performance in VTOL and high speed flight to achieve mission viability for a broader range of applications.

BRIEF SUMMARY OF THE INVENTION

The present invention addresses the aforementioned shortcomings to provide VTOL aircraft that are able to achieve high speed flight performance. To that end, embodiments of the present invention integrate various combinations of four different technologies to optimize the integration of VTOL systems in a streamlined fuselage suitable for efficient transition and high speed forward flight. 1) Pivoting Angled Ducts ("PAD"), each containing a single 2) Electric Ducted Rotor ("EDR"), 3) Ducted Column Assembly ("DCA") including a structural truss with a front inlet and an aft nozzle and multiple PADs aligned longitudinally, which rotate in unison in pitch axis, and 4) longitudinal Ventral Control Doors ("VCD") located below the Ducted Column Assembly. In various embodiments, combinations of the four inventive features may be employed to provide aircrafts that overcome the limitations of the prior art to provide aircraft with improved VTOL capability combined with efficient high speed forward flight and improved transitions between VTOL and forward flight.

In various embodiments, the aircraft includes a left and right symmetric fuselage having a forward and aft direction and including a power system, at least a right wing and left wing attached to the fuselage. The left wing is at least substantially, or actually, symmetrically opposed to the right wing.

The right wing and left wing include at least one Ducted Column Assembly, which during a first position for forward flight, the PADs are positioned to draw air from the forward direction through the forward inlet and propel the air out through the aft nozzle, and which during a third position for VTOL flight draws air from above the assembly and propels air through the Ventral Control Doors during VTOL flight. The PADs employ electrical power from the power system to propel air.

Within each Ducted Column Assembly, the PADs rotate in unison in pitch axis to create a single vector of thrust. The PADs are positioned in the horizontal direction relative to the aircraft to provide substantially forward thrust and dynamic lift in the first position. The PADs are rotated in unison to a vertical position relative to the aircraft to provide substantially vertical thrust in the third position for VTOL flight.

The Ventral Control Doors are located below the Ducted Column Assembly. During forward flight, the doors are in a closed first position to streamline the bottom of the aircraft.

During VTOL flight, the Ventral Control Doors are in the open third position, to provide left and right thrust vectoring control during substantially vertical flight.

The aircraft may include at least one processor to control the rotation speed of the EDRs, the pitch angle of the PADs, and the movement of the Ventral Control Doors. The processor may communicate with at least one control device to communicate instructions and data to the aircraft. The control device may be a stand-alone unit or part of a distributed control system operated at one or more locations and communicating with the aircraft via one or more wireless communication technologies. The aircraft and fuselage may be constructed to operate without people onboard or to carry one or more people and may enable at least one of the people onboard the aircraft to control the operation of the aircraft.

In various embodiments, the right and left wings may include multiple Ducted Column Assemblies, separated by forward and aft distance as well as left to right distance.

The power system for the aircraft may be an electrical power system, in which the rotors are electrically power rotor driven by power from the electrical power system. The electrical power system may include at least one of a battery and may include a hydrocarbon-fueled electric power generator or hydrogen fuel cell electric power generator. Alternatively, the rotors may be powered by a hydrocarbon fueled motor.

The Ducted Column Assembly, Pivoting Angled Ducts and the Ventral Control Doors may be constructed primarily from at least one of carbon fiber composite material and various types of metals depending upon the application. The aircraft may include one or more types of landing gear, such as landing skids, wheels, etc. to support runway take-off and landing and/or VTOL.

For various applications, the Ducted Column Assembly may each include at least two but no more than six Pivoting Angled Ducts. For various applications, each wing may include at least one Ducted Column Assembly, and the number that may be installed in a single given wing is only limited by the given wing area.

The wings may include conventional flight controls located outboard of and behind the Ducted Column Assemblies. The EDRs and power system may be sized to enable vertical take-off, forward flight, and vertical landing of the aircraft.

Accordingly, the present disclosure addresses the continuing need for aircraft with improved performance in both forward and VTOL flight and transition therebetween and is capable of achieving high speed flight for a broader range of applications.

BRIEF DESCRIPTION OF DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1:
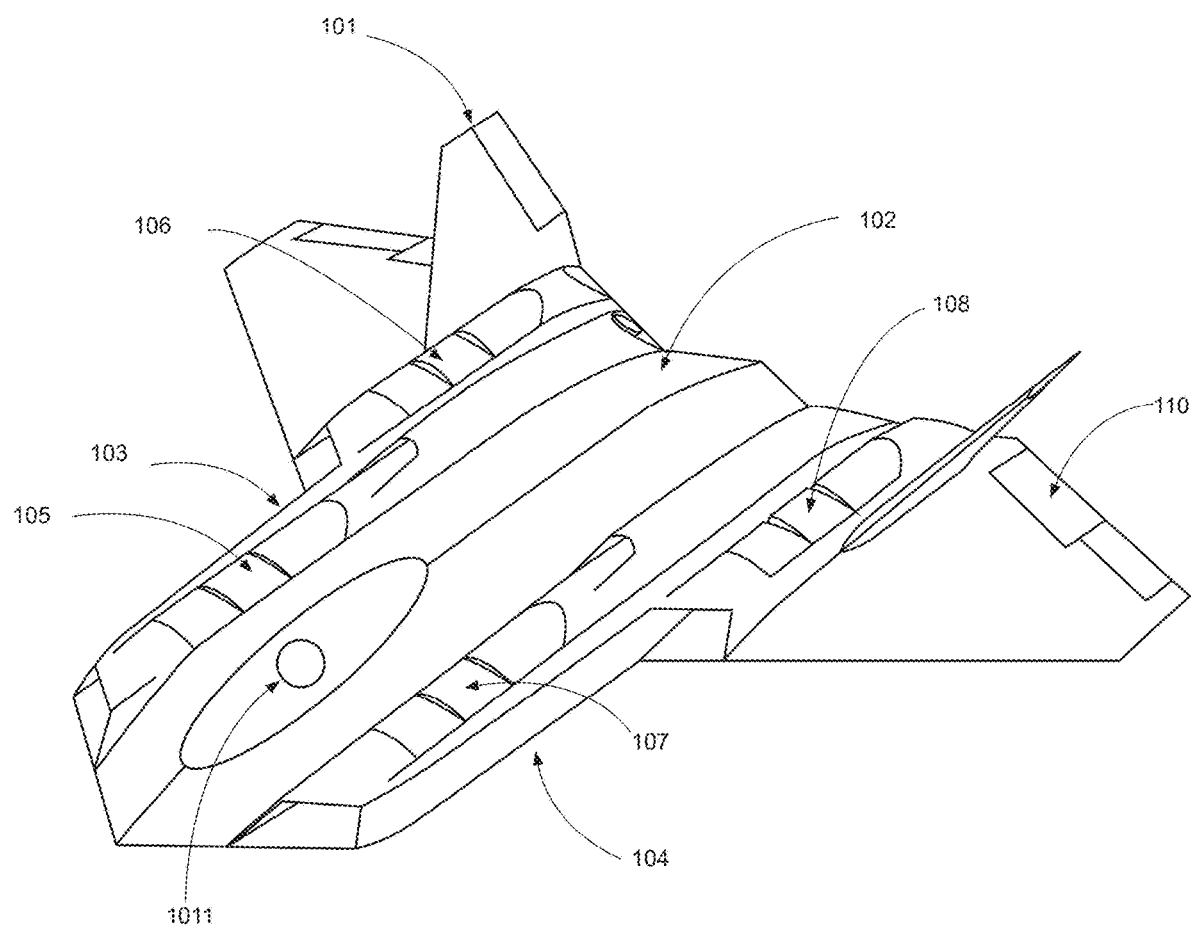
FIG. 1 shows a perspective view of exemplary aircraft embodiments, as viewed from above, in a front left position. Ducted Column Assemblies are shown in the first position for forward flight.

The terminology used herein is for the purpose of describing particular embodiments only and is not intended to limit the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of items and steps may be disclosed. Each of these may have an individual benefit and each may also be used in conjunction with one or more, or in some cases all, of the other disclosed items. Accordingly, for the sake of clarity, this description will refrain from repeating every possible combination of the individual items in an unnecessary fashion. Nevertheless, the specification and claims should be read with the understanding that such combinations are entirely within the scope of the invention and the claims.

New aircraft propulsion and lift devices and methods for control throughout all phases of flight are discussed herein. In the following description, for purposes of explanation, numerous specific details are set forth in order to provide a thorough understanding of the present invention. It will be evident, however, to one skilled in the art, that the present invention may be practiced without these specific details.

The present disclosure is to be considered as an exemplification of the invention and is not intended to limit the invention to the specific embodiments illustrated by the figures or description below.

Illustrative embodiments of various embodiments are described below. In the interest of clarity, not all features of an actual implementation are described in this specification. It will of course be appreciated that in the development of any such actual embodiment, numerous specific decisions must be made to achieve the developer's specific goals, such as compliance with system-related and business-related constraints, which will vary from one implementation to another. Moreover, it will be appreciated that such a development effort might be complex and time-consuming but would nevertheless be a routine under-taking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation.

Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The invention and steps will be understood, both as to its structure and operation, from the accompanying description, taken in conjunction with the accompanying drawings. It should be understood that various components, parts, features of the embodiment may be combined together and/or interchanged with one another, all of which are within the scope of the present invention, even though not all variations and embodiments of the invention are shown in the drawings.

It should also be understood that the mixing and matching of features, elements, size and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

FIG. 1 shows a perspective front left view of various embodiments of an aircraft 101 of the present invention. The aircraft 101 includes a central fuselage 102 that may contain the components of an electrical power-generation and/or storage system, as well as seating and controls for an aircraft configuration occupied by a person 1011. The electrical power generation and storage systems may include but are not restricted to one or many hydrocarbon burning turbines producing electricity; batteries; hydrogen-based fuel-cells; a combination of the listed electrical power generation and storage systems, etc.

The aircraft 101 may include a right-hand (RH) Wing Assembly 103 and left-hand (LH) Wing Assembly 104. The RH Wing Assembly 103 may include a front inboard Ducted Column Assembly 105 and a back outboard RH Ducted Column Assembly 106. The LH Wing Assembly 104 may include a front inboard Ducted Column Assembly 107 and a back outboard Ducted Column Assembly 108. Ducted Column Assemblies 105-108 are shown in a first position for forward flight. The Wing Assemblies may include at the trailing edge, or leading edge, conventional flight controls for forward flight 110.

Figure 2:
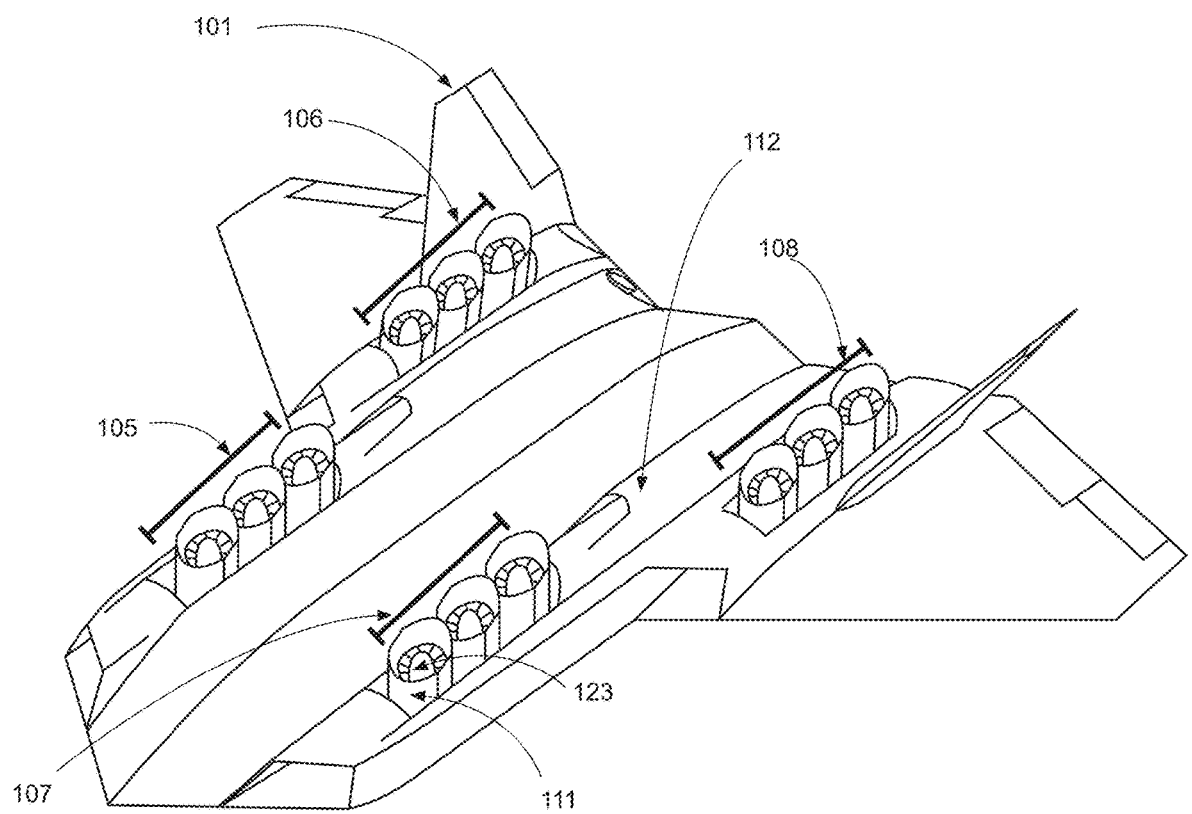
FIG. 2 shows a perspective view of exemplary aircraft embodiments, as viewed from above, in the front left position. Ducted Column Assemblies are shown in the third position for VTOL flight.

FIG. 2 shows various embodiments of an aircraft 101 with the Ducted Column Assemblies shown in a third position for VTOL flight. The Ducted Column Assemblies 105-108 may include one or more PADs 111, each housing an EDR 123. While the embodiments shown in several figures depict three EDR Units in each Ducted Column Assembly, one of ordinary skill will appreciate that the number of PADs 111 may be changed to a specific application, such as four. A Wing Assembly may include an embedded nacelle, located behind Ducted Column Assemblies 105, 107 that may contain the components of an electrical power-generation and/or storage system, such as a hydrocarbon burning turbines producing electricity.

Figure 3A:
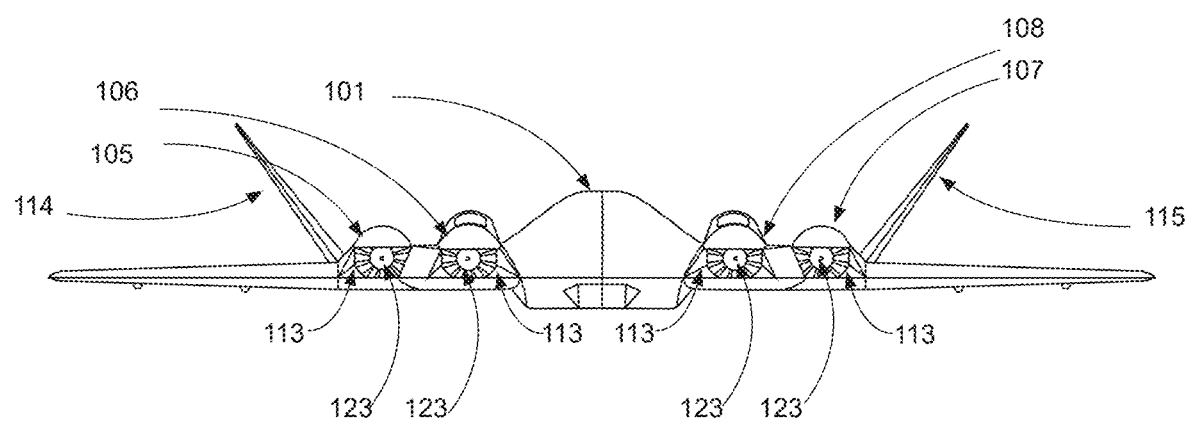
FIG. 3A shows an orthographic view of exemplary aircraft embodiments, as viewed from directly in front. Pivoting Angled Ducts are configured for forward flight.

FIG. 3A shows an orthographic view of the aircraft 101 as viewed from directly in front with Ducted Column Assemblies 105-108 in the first position for forward flight. It can be seen that the Ducted Column Assembly inlets 113 provide air to the EDR 123 for propelling the embodiment forward in the first position for forward flight.

Figure 3B:
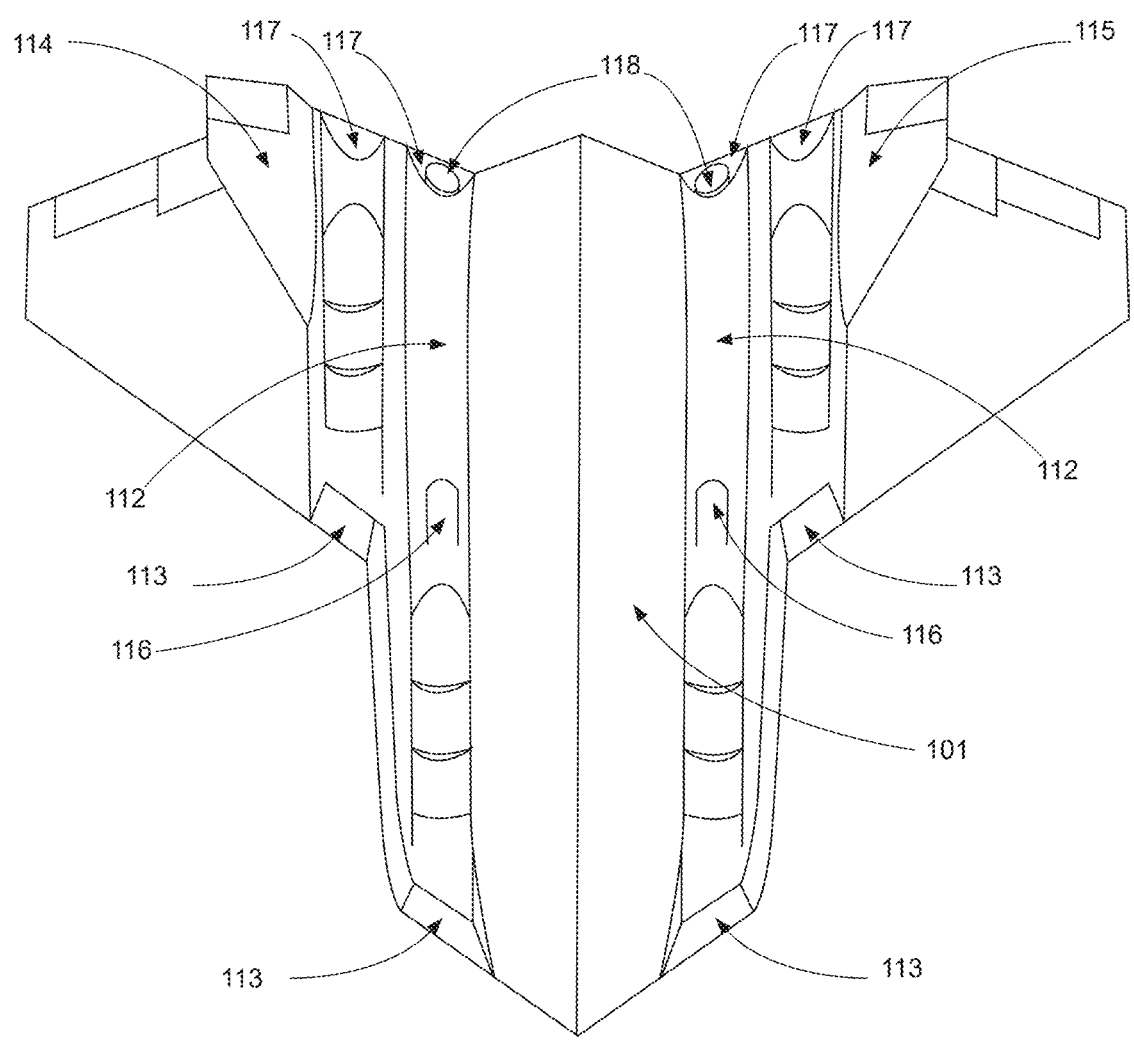
FIG. 3B shows an orthographic view of exemplary aircraft embodiments, as viewed from directly above. The front of the aircraft is at bottom of figure.

FIG. 3B shows an orthographic view of the aircraft 101 as viewed from directly above with the front of the aircraft at the bottom of the figure. Ducted Column Assemblies 105-108 are shown in the first position for forward flight. The Wing Assemblies 103, 104 may include vertically oriented tail surfaces 114, 115 which provide conventional control in forward flight. A Wing Assembly may include an embedded nacelle 112, located behind Ducted Column Assemblies 105, 107 that may contain the components of an electrical power-generation and/or storage system, such as a hydrocarbon burning turbines producing electricity. An electrical power generating system may include a separate top-mounted inlet 116 for air for the combustion process. Each Ducted Column Assembly includes an aft exhaust nozzle 117. If an electrical power generating system is installed in the wing assembly, a secondary exhaust may be located within the main exhaust nozzle 118.

Figure 4:
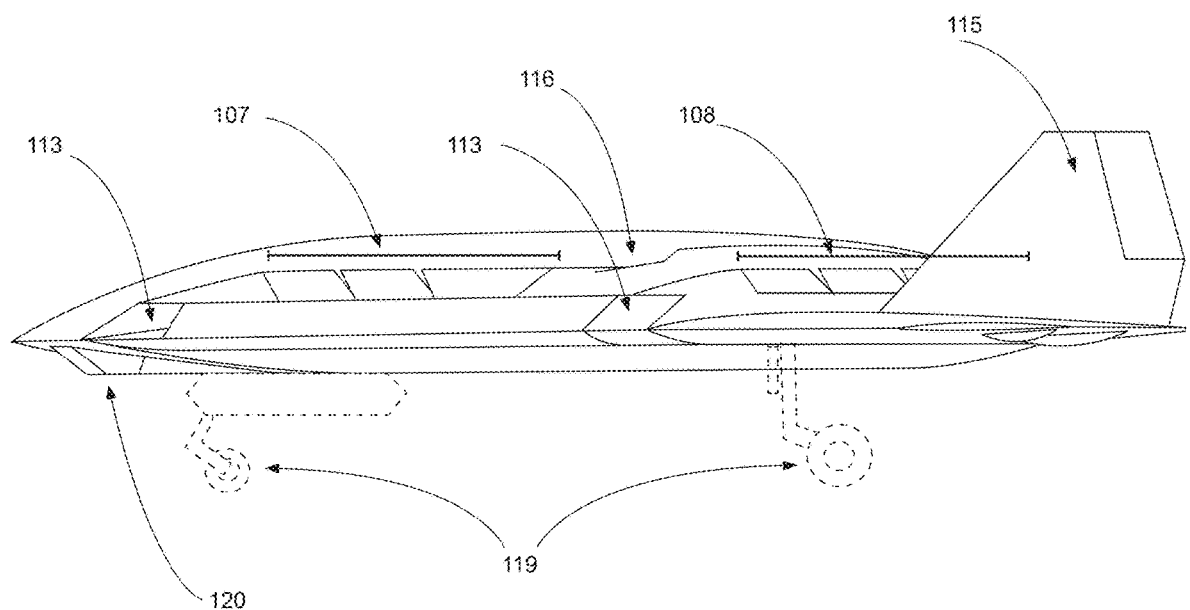
FIG. 4 shows an orthographic view of exemplary aircraft embodiments, as viewed from directly from the left.

FIG. 4 shows an orthographic view of embodiments of the aircraft 101 as viewed directly from the left side Ducted Column Assemblies 107, 108 are shown in the first position for forward flight. Various embodiments feature wheeled landing gear 119, which may be employed to enable conventional runway take-off and landing. Other devices may be attached to enable landing the aircraft 101. Various embodiments feature nose mounted conformal electro-optical sensors 120, or other equipment, which may be employed to enable safe navigation during flight.

Figure 5:
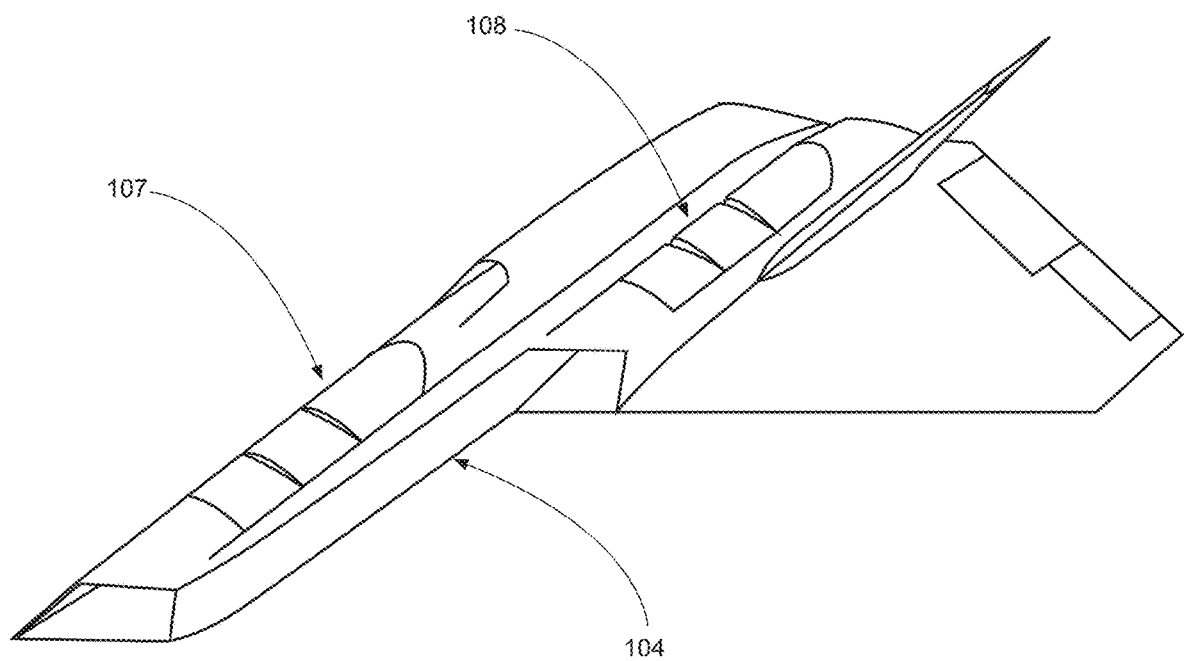
FIG. 5 shows a perspective view as above and in front of an exemplary LH Wing Assembly.

FIG. 5 shows a perspective view of the embodiment (LH) Wing Assembly 104, as viewed from above, in the front left position. Ducted Column Assemblies 107, 108 are shown in the first position for forward flight.

Figure 6:
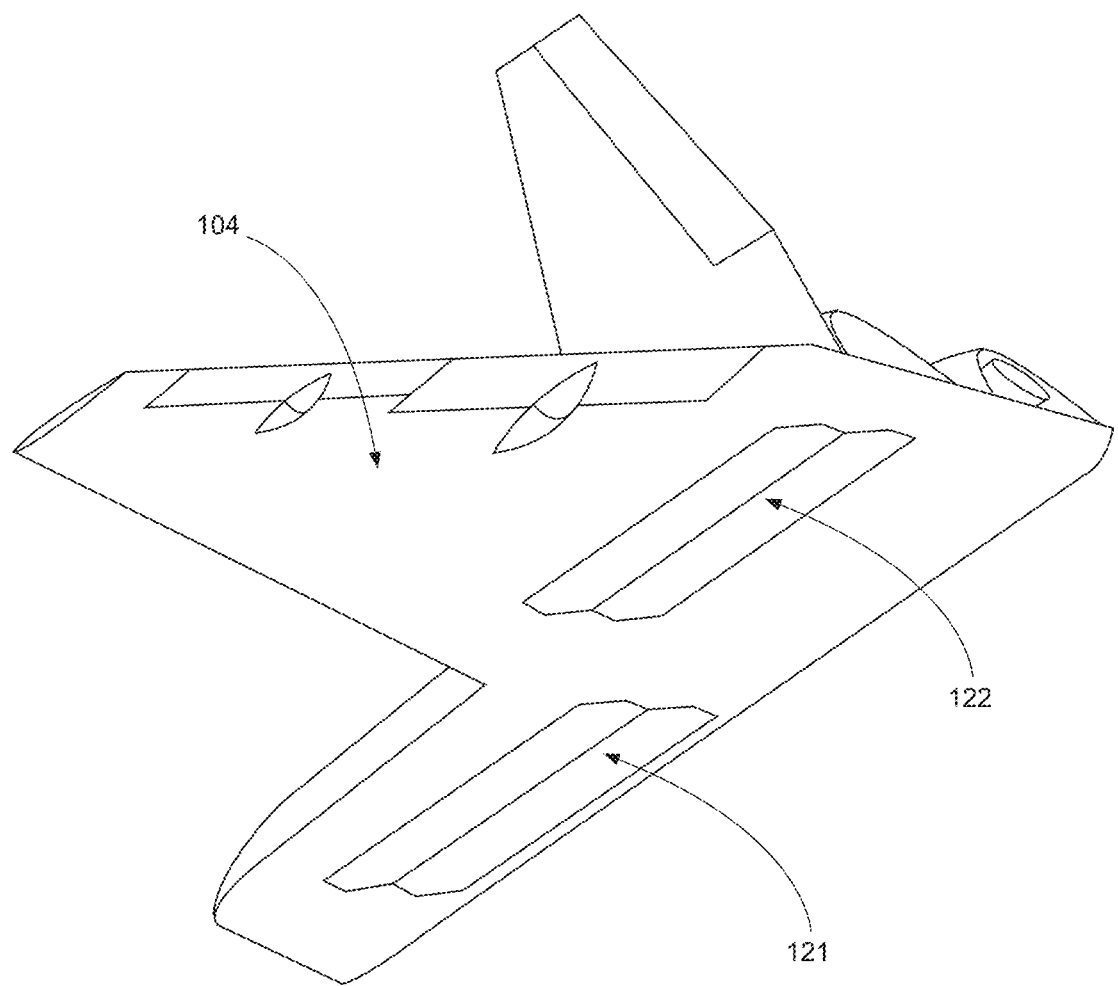
FIG. 6 shows a perspective view as behind and underneath of an exemplary LH Wing Assembly.

FIG. 6 shows a perspective view of the embodiment (LH) Wing Assembly 104, as viewed from below, in the aft left position. Ventral Control Door Assemblies 121, 122 are shown in the closed first position for forward flight.

Figure 7:
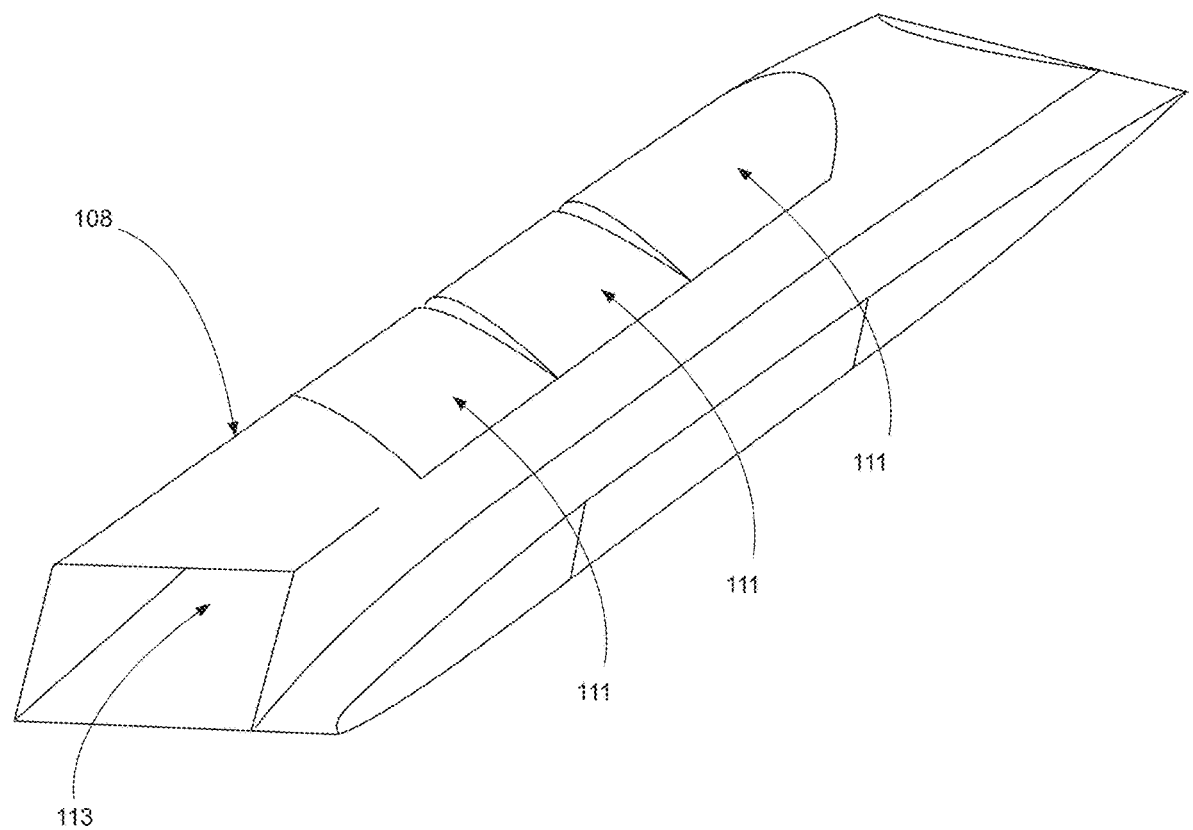
FIG. 7 shows a perspective view as above and in front of an exemplary Ducted Column Assembly.

FIG. 7 shows a perspective view of the embodiment (LH) aft Ducted Column Assembly 108, as viewed from above, in the front left position. The PADs 111, are shown in the first position for forward flight to receive air via forward inlet 113.

Figure 8:
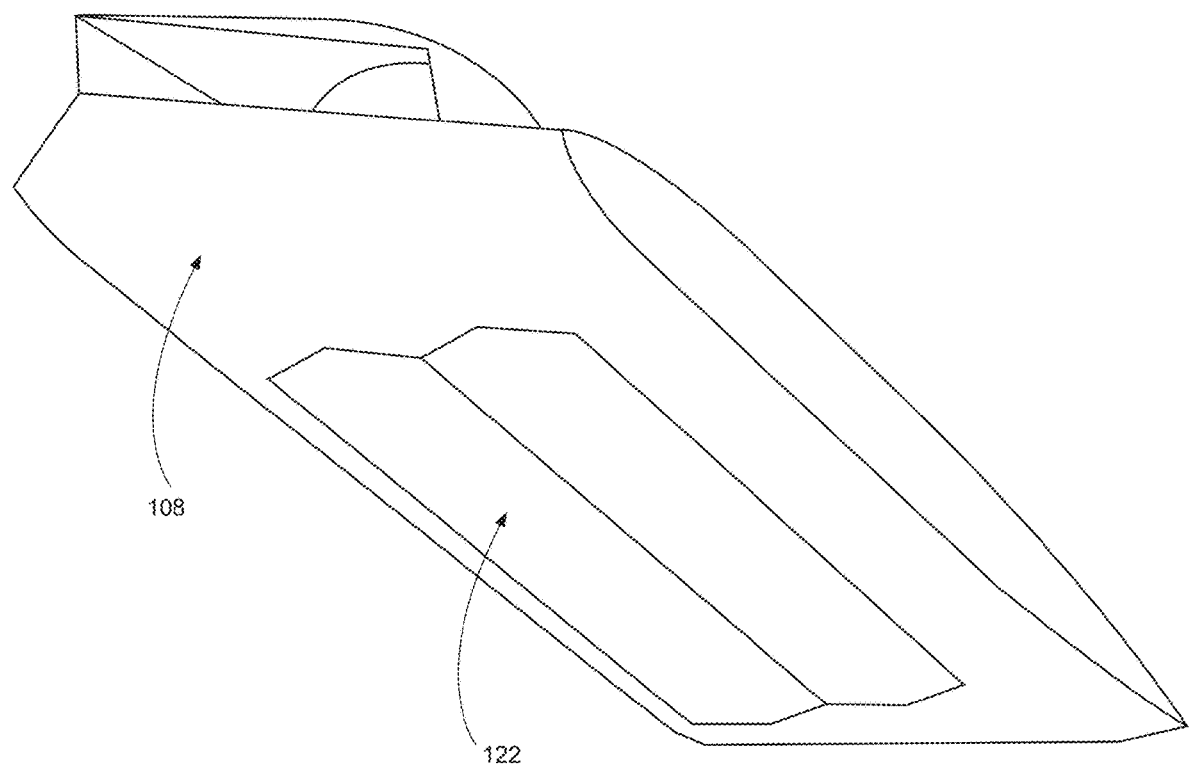
FIG. 8 shows a perspective view as below and in front of an exemplary Ducted Column Assembly.

FIG. 8 shows a perspective view of the embodiment (LH) aft Ducted Column Assembly 108, as viewed from below, in the front left position. The Ventral Control Door assembly 122, is shown in the closed first position for forward flight.

Figure 9:
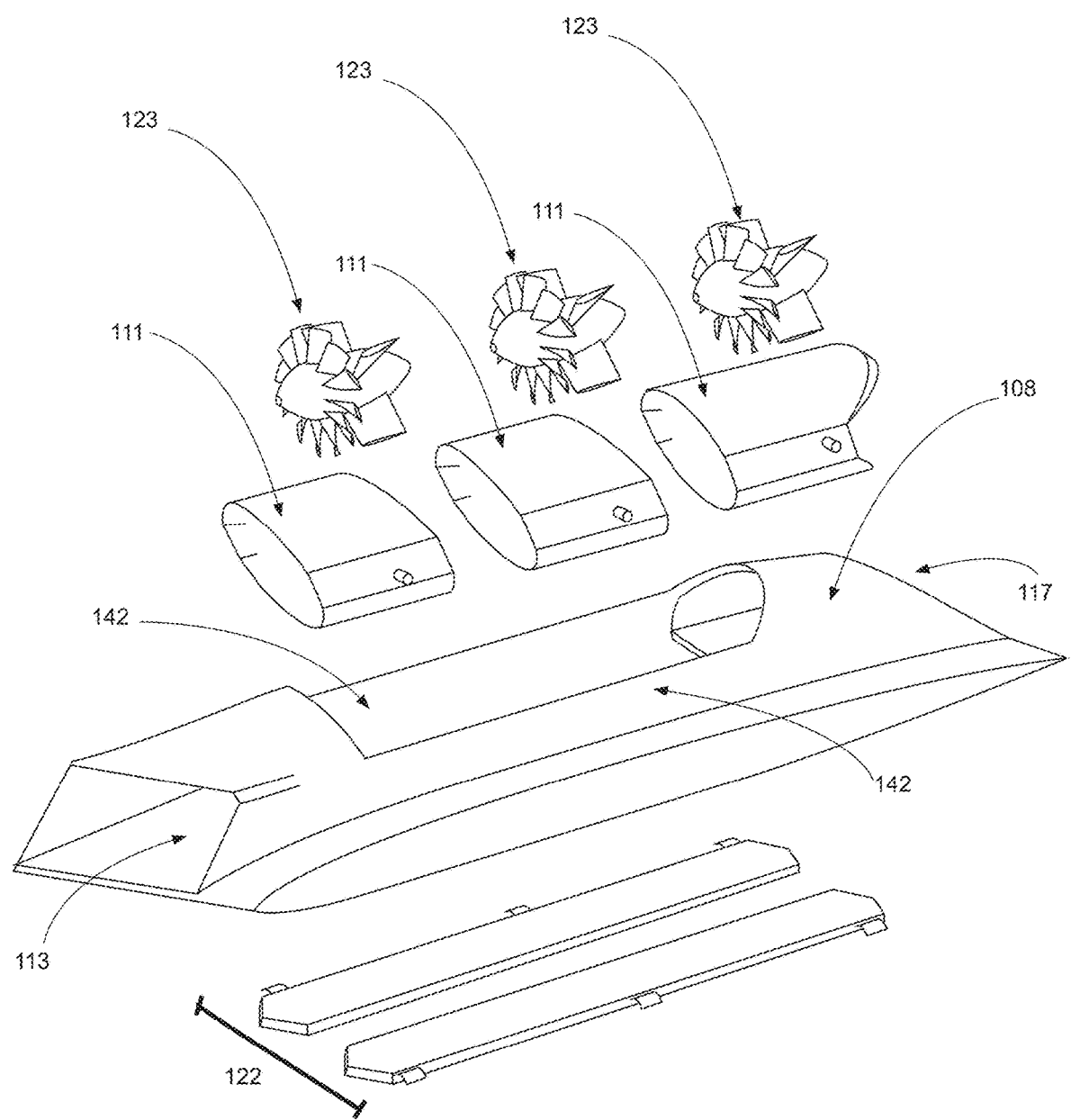
FIG. 9 shows a perspective exploded view as above and in front of an exemplary Ducted Column Assembly. The PADs and Ventral Control Door assembly are positioned for forward flight.

FIG. 9 shows a perspective exploded view of the embodiment LH aft Ducted Column Assembly 108, as viewed from above, in the front left position. The primary structure of the Ducted Column Assembly may consist of two substantially longitudinal LH and RH structural members 142, joined at the front by the circumference of the inlet 113, and joined aft by the circumferential structure of the aft nozzle 117. The PADs 111, are shown in the first position for forward flight. Each PAD 111 may contain a single EDR 123. The orientation of the exploded parts is in the first position for forward flight.

Figure 10:
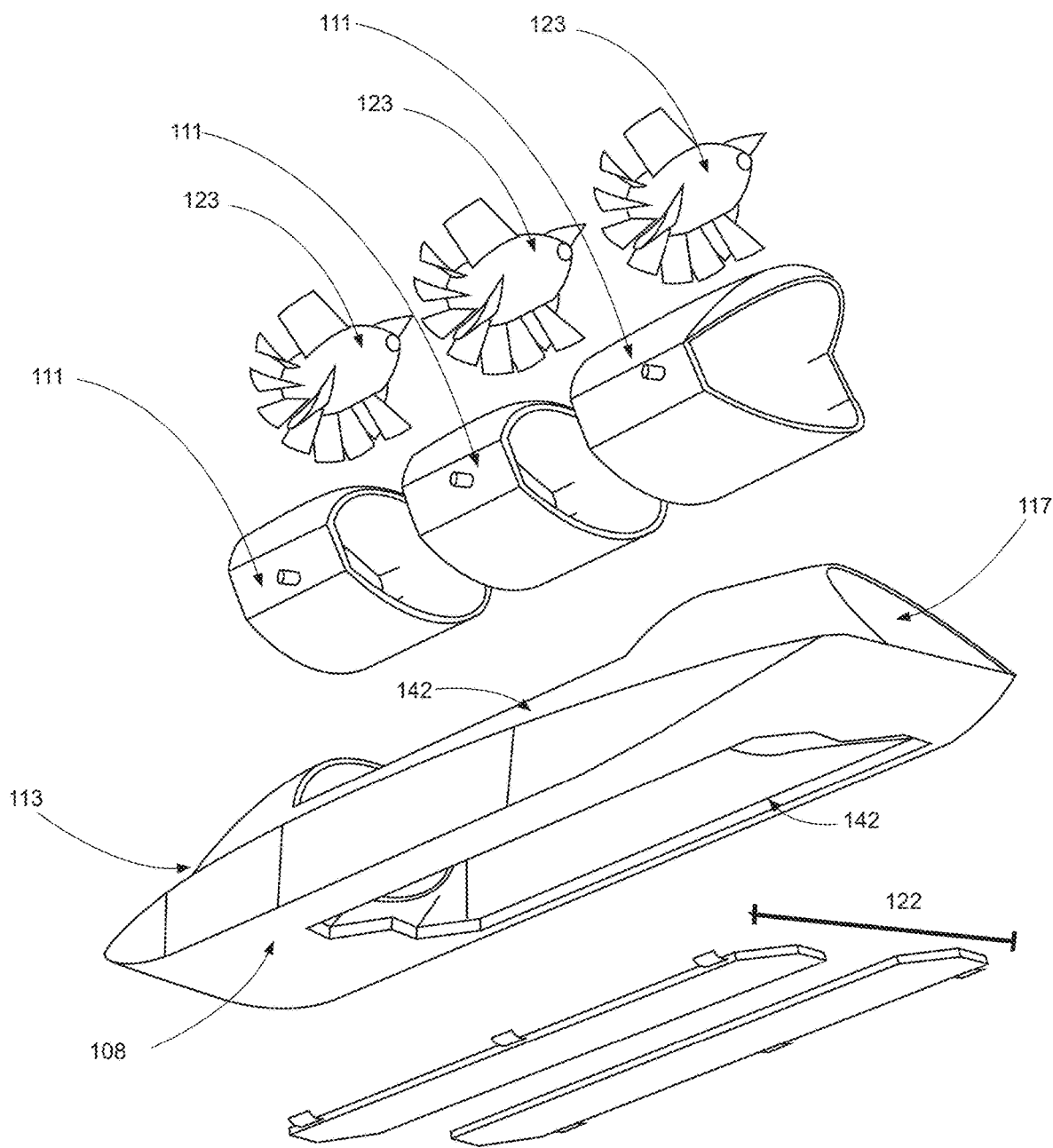
FIG. 10 shows a perspective exploded view as below and behind an exemplary Ducted Column Assembly. The PADs and Ventral Control Door assembly are positioned for forward flight.

FIG. 10 shows a perspective exploded view of the embodiment LH Aft Ducted Column Assembly 108, as viewed from below, in the aft left position. The PADs 111, are shown in the first position for forward flight. Each PAD 111 may contain a single EDR 123. The Ventral Control Door assembly 122, is shown in the closed first position for forward flight.

Figure 11A:
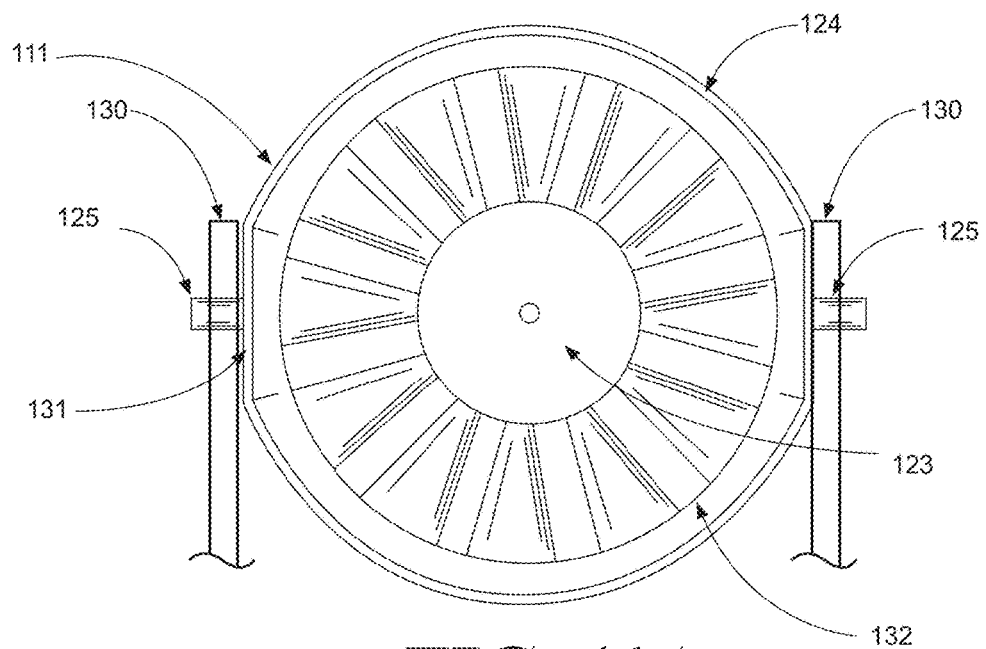
FIG. 11A shows an orthographic view of an exemplary PAD as viewed from directly from the front.

FIG. 11A shows an orthographic view from directly in front of a single PAD 111. Primary exterior structure includes a substantially axial cylindrical outer structure 124, LH and RH protruding mounting spindles 125, for pivoting the PAD 111 and transferring propulsive force to the Ducted Column Assembly 105-108. Primary internal structure includes an aerodynamically shaped inner duct 132, for obtaining maximum performance from the installed EDR 123. Each PAD 111 contains at least one EDR 123, which is physically mounted to the inner duct and or outer structure. Various embodiments of each PAD 111 may include flattened LH and RH sides 131 to reduce spacing between the outer structure 124 of each PAD 111 and the inner wall 130 of the Ducted Column Assembly 105-108.

Figure 11B:
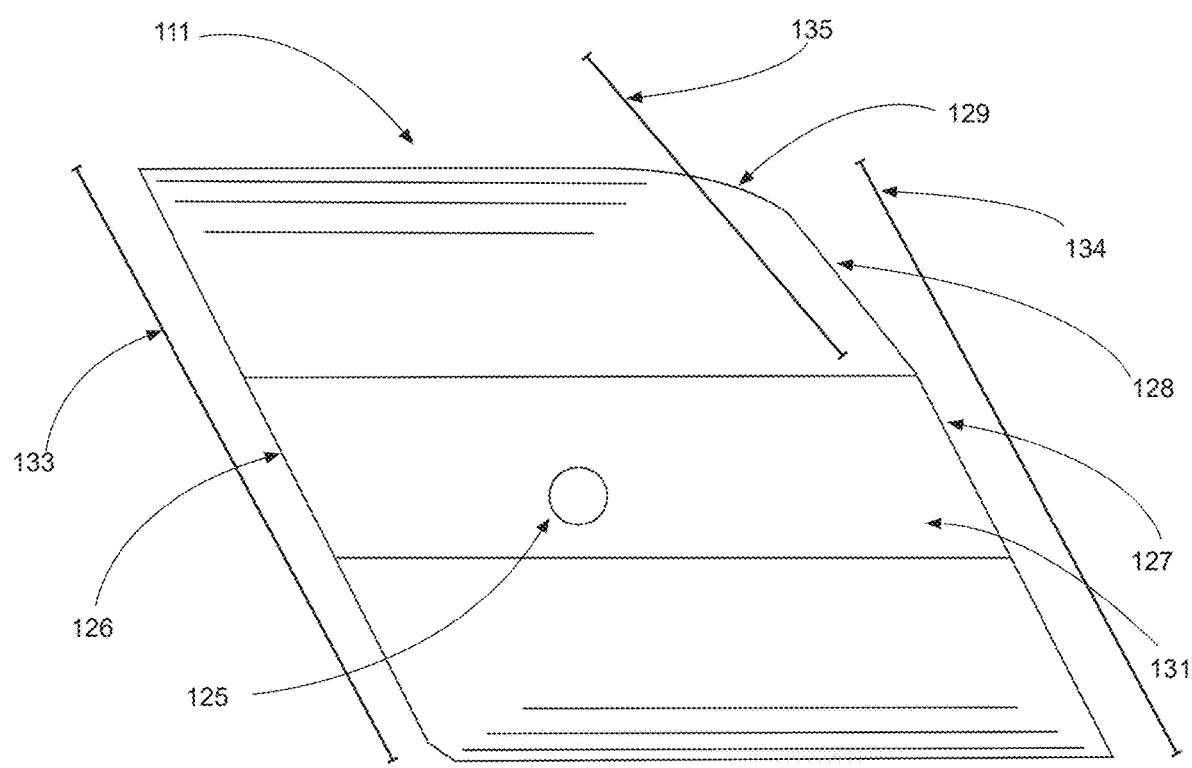
FIG. 11B shows an orthographic view of an exemplary PAD as viewed from directly from the left with the front at the left of the figure.

FIG. 11B shows an orthographic view directly from the side of a single PAD 111. The PAD 111 has a front face 126 having a front face angle 133 ranging from approximately ten degrees from vertical to 45 degrees, e.g., 27 degrees top to bottom. The PAD 111 has an aft face 127 having a front face angle 134 ranging from approximately ten degrees from vertical to 45 degrees, e.g., 27 degrees top to bottom. The predominant angle of both the front and aft faces may be equal to reduce spacing between different PADs 111 in the first position during forward flight. A top section 128, of the aft face 127, may be further angled forward 135, and a top surface of the cylindrical structure featuring a rounded portion 129, in order to create a wider open path for airflow in the first position between two PADs 111. Various embodiments of PAD 111 may locate the mounting spindles 125 at any location within the height and front to back distance occupied by the outer structure 124.

Figure 12A:
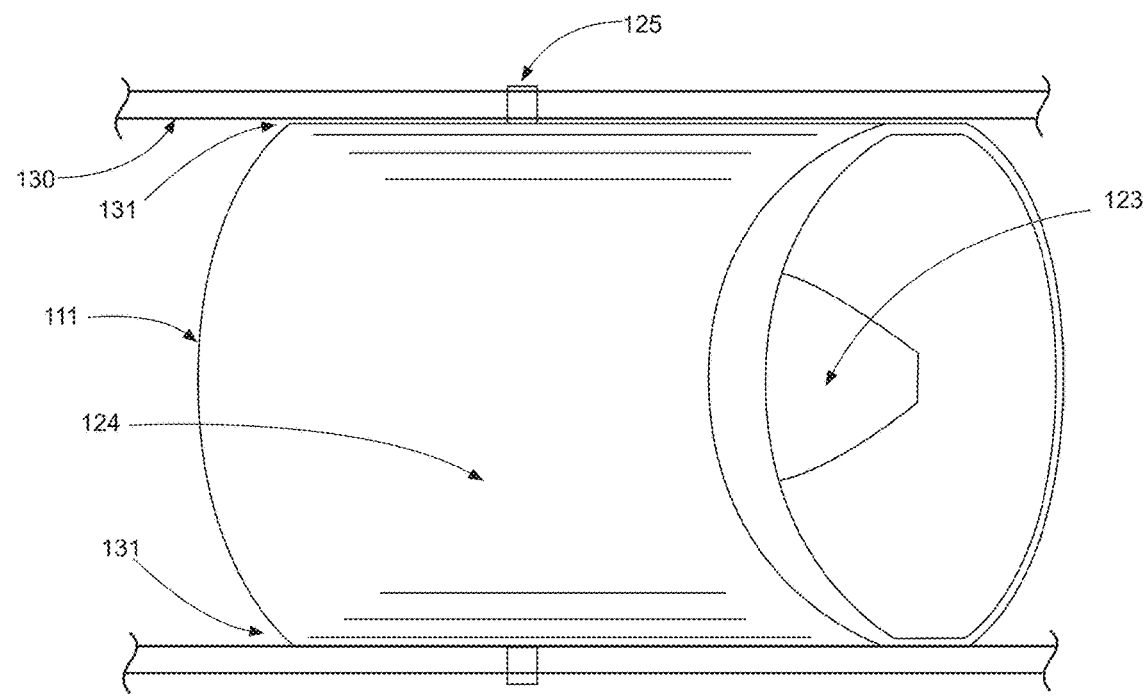
FIG. 12A shows an orthographic view of an exemplary PAD as viewed from directly from above with the front at the left of the figure.
Figure 12B:
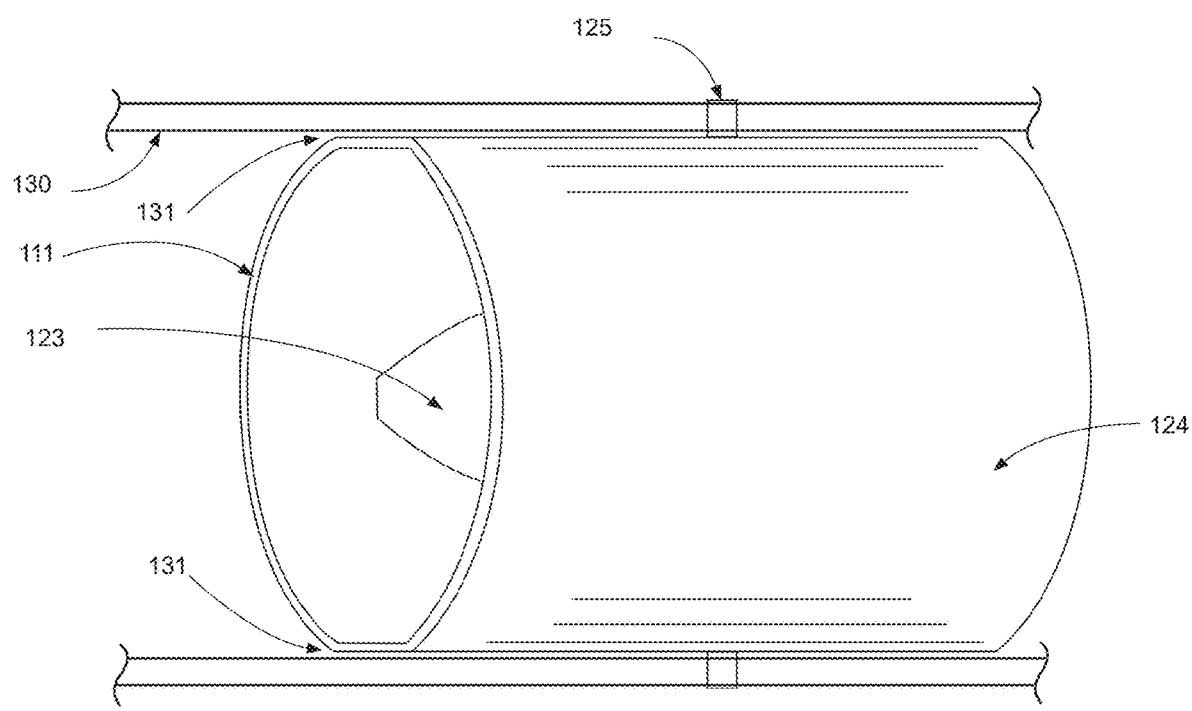
FIG. 12B shows an orthographic view of an exemplary PAD as viewed from directly from below with the front at the left of the figure.

FIGS. 12A & 12B show orthographic views from directly above a single PAD 111 with the front of the PAD 111 on the left. and right of the respective figures. The PAD 111 has a primary exterior structure that includes a substantially axial cylindrical outer structure 124, LH and RH protruding mounting spindles 125, for pivoting the PAD 111 and transferring propulsive force to the inner wall 130 of Ducted Column Assembly 105-108. Each PAD 111 may contain at least one EDR 123. Various PAD 111 embodiments may include flattened LH and RH sides 131, of the outer structure 124, to reduce spacing between the outer structure 124, and the inner wall 130 of the Ducted Column Assembly 105-108.

Figure 13A:
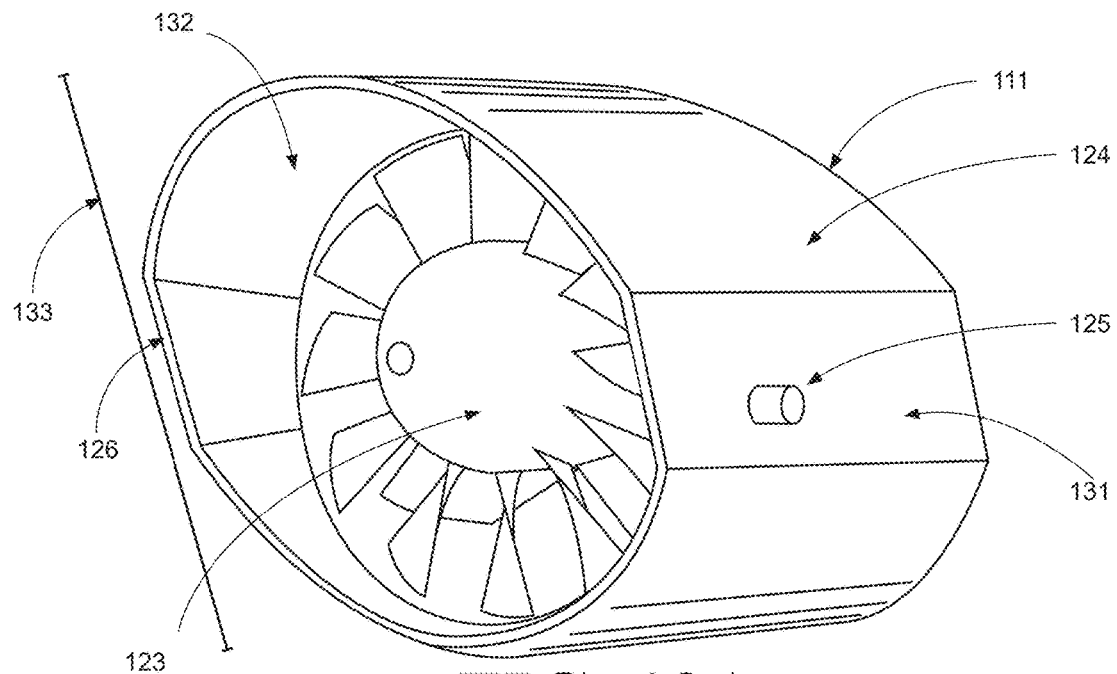
FIG. 13A shows a perspective view of an exemplary PAD as viewed from in front and the left, with the front at the left of the figure.
Figure 13B:
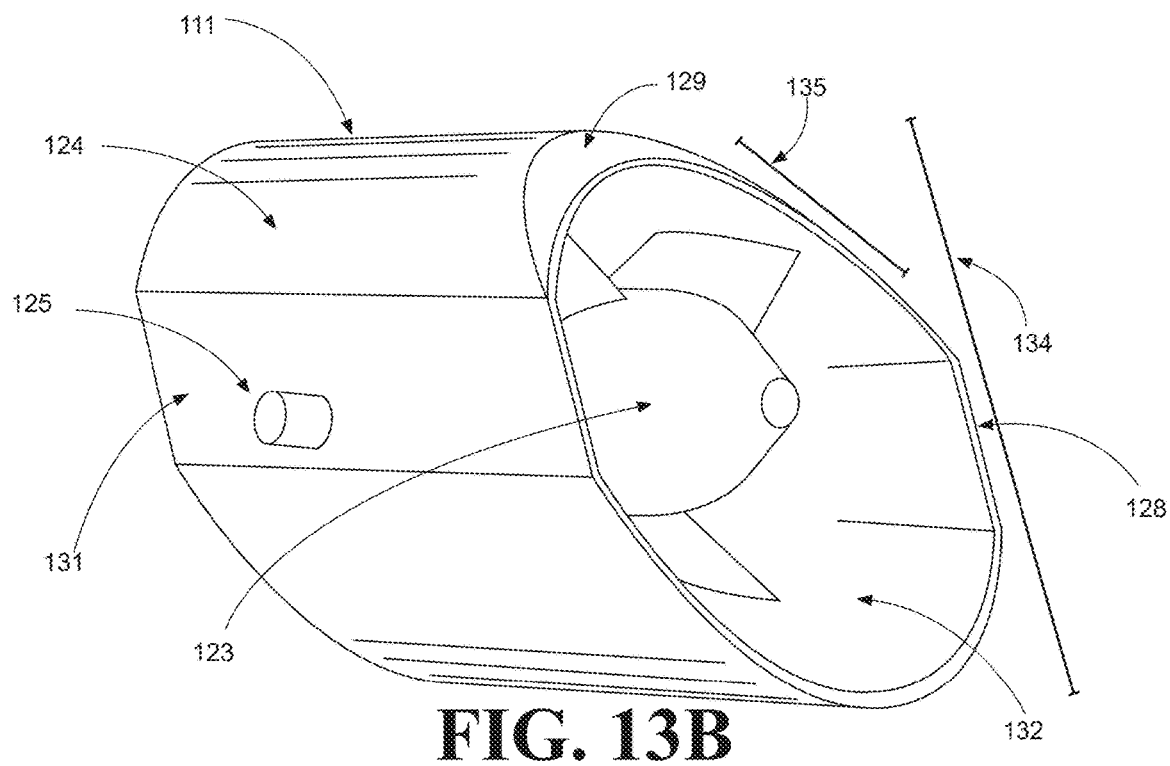
FIG. 13B shows a perspective view of an exemplary PAD as viewed from behind and the left, with the front at he left of the figure.

FIGS. 13A & 13B show respective front and rear perspective views of a single PAD 111. The PAD 111 has a primary exterior structure which includes a substantially axial cylindrical outer structure 124, LH and RH protruding mounting spindles 125, for pivoting the PAD 111 and transferring propulsive force to the Ducted Column Assembly 105-108. Each PAD 111 may contain at least one EDR 123. As previously noted, various embodiments of PAD 111 may locate the mounting spindles 125 at any location within the height and front to back distance occupied by the outer structure 124. Various embodiments may include flattened LH and RH sides 131, of the outer structure 124. The PAD 111 generally has an internal structure that includes an aerodynamically shaped inner duct 132, for obtaining maximum performance from the installed EDR 123.

Figure 14A:
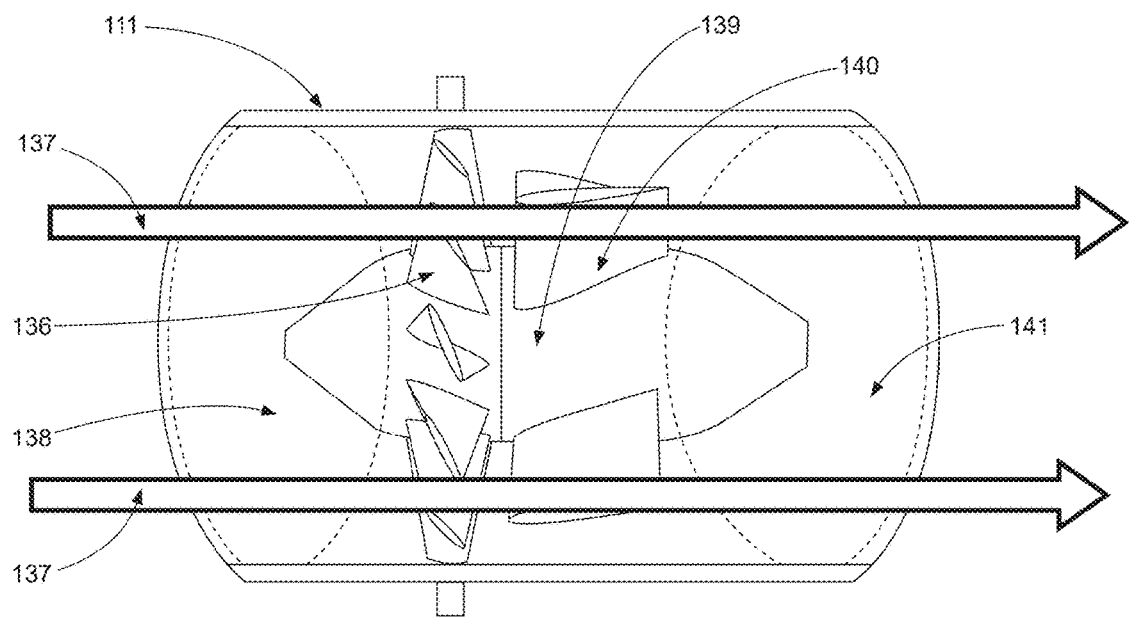
FIG. 14A shows an orthographic cutaway view of an exemplary PAD as viewed from directly above, with the front at the left of the figure.
Figure 14B:
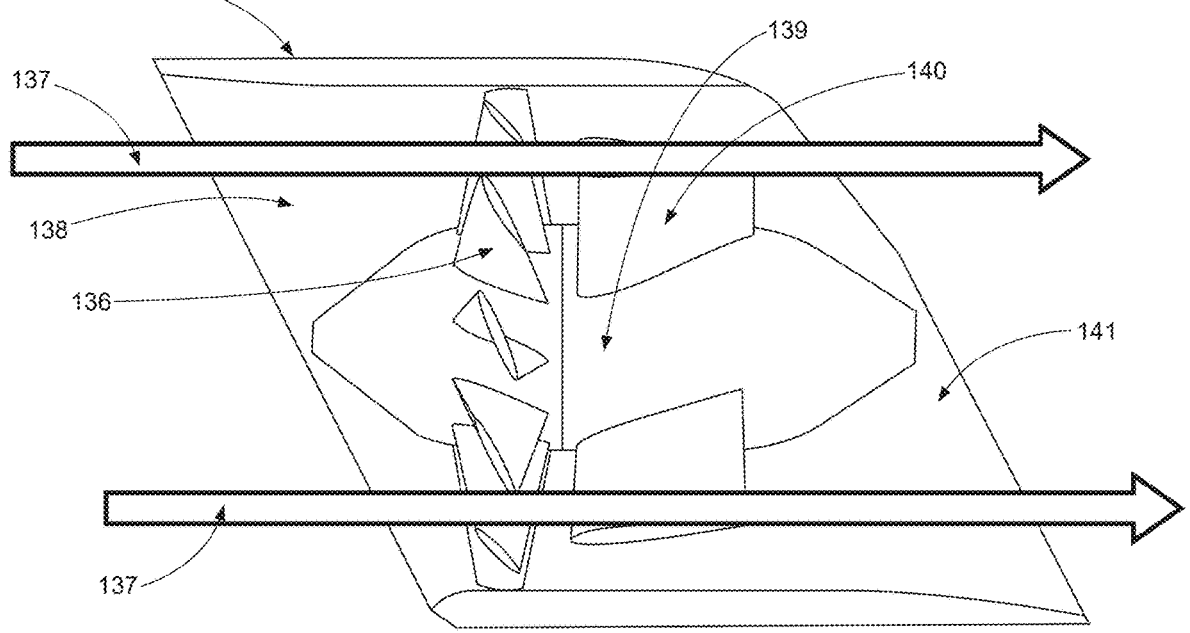
FIG. 14B shows an orthographic cutaway view of an exemplary PAD as viewed from directly from the left with the front at the left of the figure. Directional arrows show exemplary airflow and forces acting upon the Ducted Column Assembly

FIGS. 14A & 14B show orthographic cutaway views of a single PAD 111 as seen from above and the left respectively with the front of the PAD 11 on the left of the figure. The EDR 123 includes a rotor 136 that is rotated by an electric motor 139 to create airflow 137 into the front duct inlet 138 of the PAD 111 by propelling the air past the electric motor 139 and supporting stators 140, and out the aft PAD 111 through an outlet 141, which may be a nozzle.

Figure 15A:
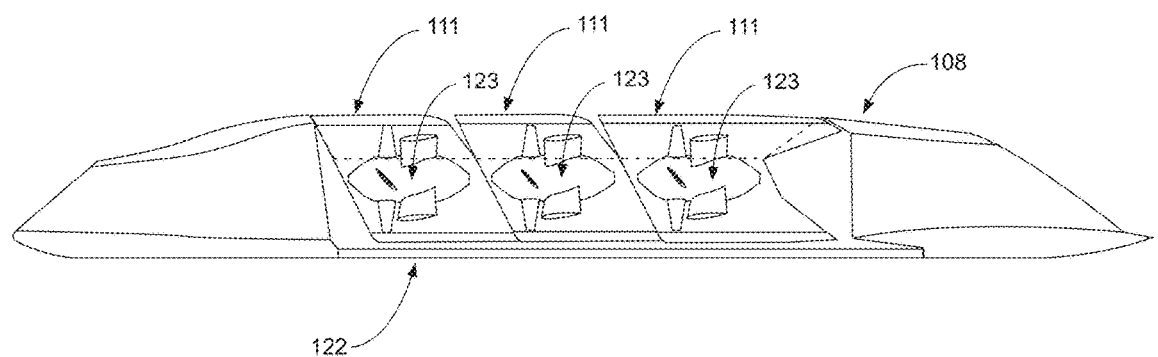
FIG. 15A shows an orthographic cutaway view of an exemplary Ducted Column Assembly from the left with the front at the left of the figure. The PADs and Ventral Control Doors are positioned for forward flight.

FIG. 15A shows an orthographic cutaway of a single Ducted Column Assembly 108 as seen from the left. The front of the Ducted Column Assembly 108 is at the left of the figure. The three PADs 111, are shown in the first position for forward flight. The Ventral Control Door assembly 122 is shown closed, in the first position, for forward flight.

Figure 15B:
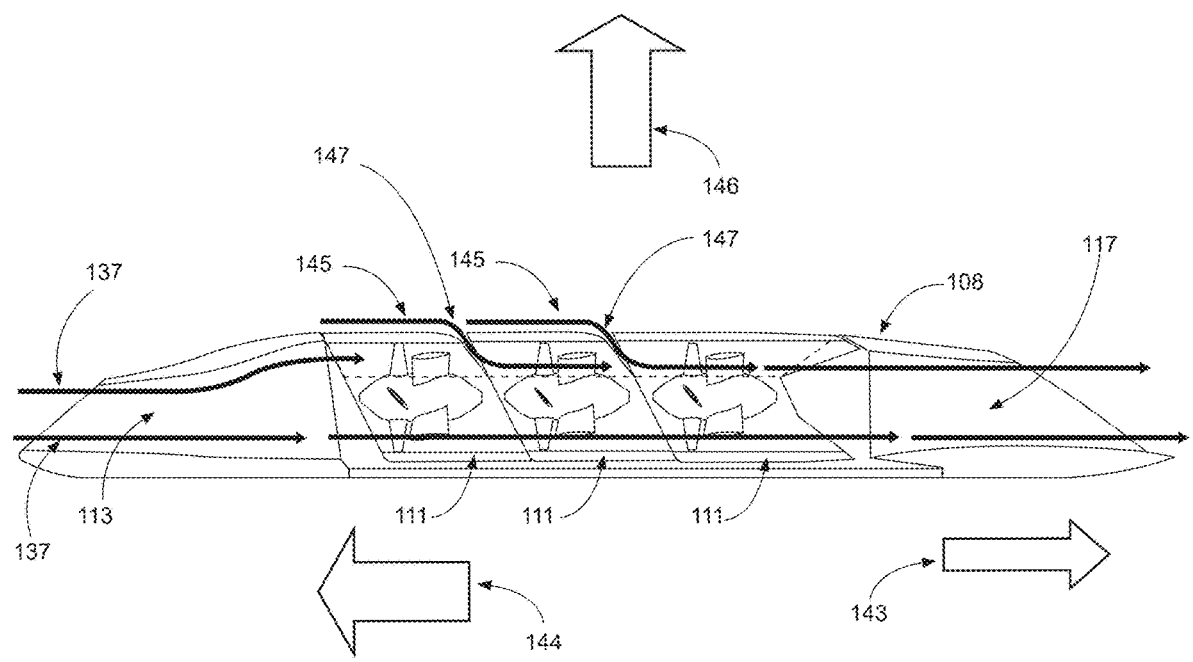
FIG. 15B shows an orthographic cutaway view of an exemplary Ducted Column Assembly from the left with the front at the left of the figure. The PADs and Ventral Control Doors are positioned for forward flight. Directional arrows show exemplary airflow as well as aerodynamic forces acting upon the Ducted Column Assembly

FIG. 15B shows the primary airflow path 137 through the Ducted Column Assembly 108 shown in FIG. 15A. Air is drawn into the forward inlet 113, propelled through multiple PADs 111 by multiple EDRs 123, and output through the aft nozzle 117, creating thrust 143 in the aft direction to propel the embodiment aircraft 101 in the forward direction 144. Secondary airflow paths 145 may be provided from the top via openings between adjacent PADs 111 to enhance performance of the aircraft 101. The secondary airflow path embodiments may be configured be to increase the propulsive force from the EDRs 123, as compared to three inline EDRs inside of a completely closed continuous tube. The secondary airflow path embodiments may also be configured to increase dynamic lift 146, over the top surface of the Ducted Column Assembly 108, compared to a continuous closed surface across the top of the Ducted Column Assembly.

Figure 16A:
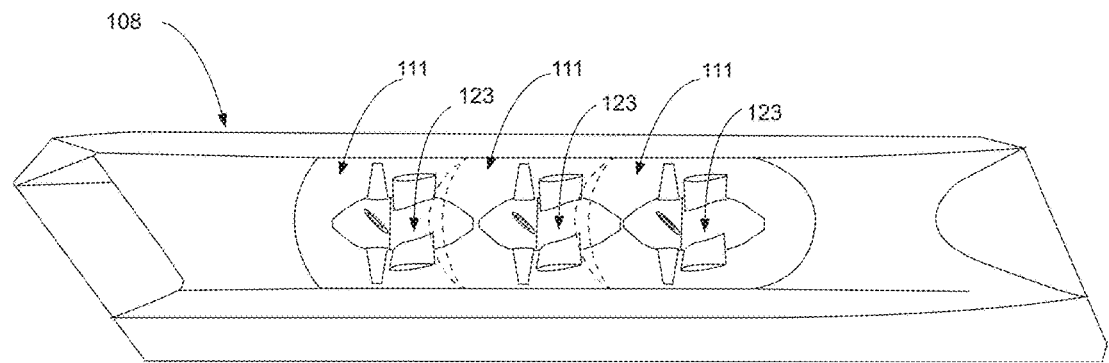
FIG. 16A shows an orthographic cutaway view of an exemplary Ducted Column Assembly from above with the front at the left of the figure. The PADs and Ventral Control Doors are positioned for forward flight.

FIG. 16A shows an orthographic cutaway of a single Ducted Column Assembly 108 as seen from above with the front of the Ducted Column Assembly 108 at the left of the figure. The three PADs 111, and enclosed EDRs 123, are shown in the first position for forward flight.

Figure 16B:
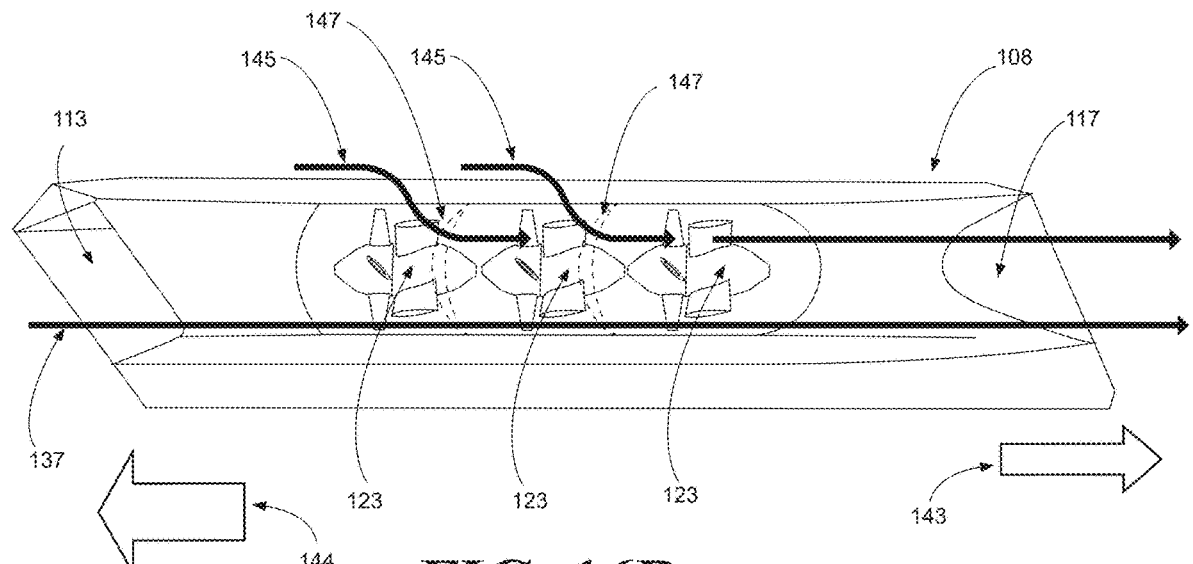
FIG. 16B shows an orthographic cutaway view of an exemplary Ducted Column Assembly from above with the front at the left of the figure. The PADs and Ventral Control Doors are positioned for forward flight. Directional arrows show exemplary airflow as well as aerodynamic forces acting upon the Ducted Column Assembly

FIG. 16B shows the primary airflow path 137 through the Ducted Column Assembly 108 of FIG. 16A. Air is drawn into the forward inlet 113, propelled through multiple PADs 111 by multiple EDRs 123, and output through the aft nozzle 117, creating thrust 143 in the aft direction to propel the embodiment aircraft in the forward direction 144. Secondary airflow paths 145 may be provided from the left and right sides via openings between adjacent PADs 111 to enhance performance of the aircraft 101. The secondary airflow path embodiments may be configured be to increase the propulsive force from the EDRs 123, as compared to three EDRs adjacent inside of a completely closed continuous tube. The secondary airflow path embodiments may also be configured to increase dynamic lift 146, over the top surface of the Ducted Column Assembly 108, compared to a continuous closed surface across the top of the Ducted Column Assembly.

Figure 17A:
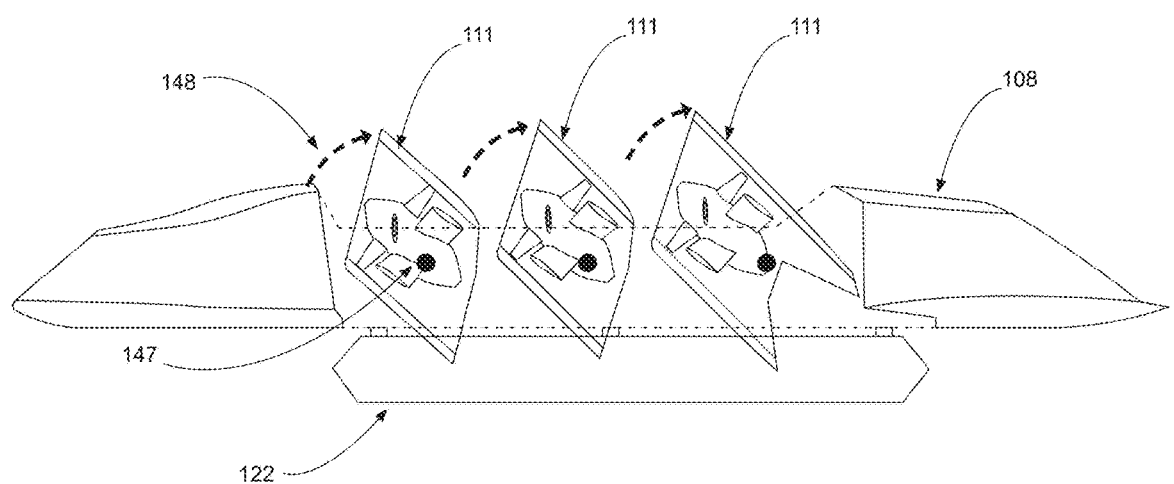
FIG. 17A shows an orthographic cutaway view of an exemplary Ducted Column Assembly from the left with the front at the left of the figure. The PADs and Ventral Control Doors are positioned for transitional flight.

FIG. 17A shows an orthographic cutaway of a single Ducted Column Assembly 108 as seen from the left with the front of the Ducted Column Assembly 108 on the left of the figure. The three PADs 111, are shown in a second position for transitional flight. When actuated, The PADs 111 pivot on individual axes 147 around spindles 125, in unison, in the pitch axis, creating a large opening 148 between subsequent PADs 111 and the Ducted Column Assembly 108. The individual pivot 147 of each PAD 111 may be located in such a way that upon actuation, subsequent aft PADs 111 are physically above the preceding PAD 111. The Ventral Control Door assembly 122 is shown open, in the second position, for transitional flight.

Figure 17B:
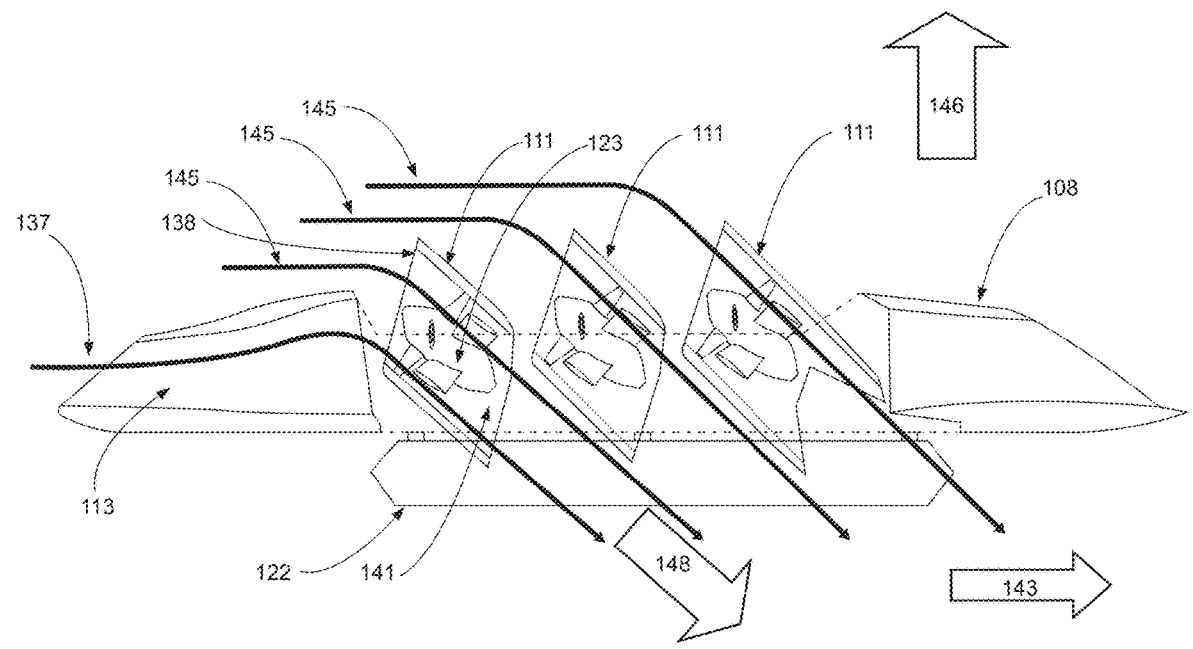
FIG. 17B shows an orthographic cutaway view of an exemplary Ducted Column Assembly from the left with the front at the left of the figure. The PADs and Ventral Control Doors are positioned for transitional flight. Directional arrows show exemplary airflow as well as aerodynamic forces acting upon the Ducted Column Assembly

FIG. 17B shows the primary airflow 145 through the Ducted Column Assembly 108 of FIG. 17A. When actuated, The PADs 111 pivot upward in unison, in the pitch axis. Air is drawn into the PAD 111 from above the Ducted Column Assembly 108. Primary Airflow 137 is drawn into the forward inlet 113, propelled through the first PAD inlet 138, and propelled by the EDR 123 out the PAD outlet 141 on a directional vector 148 that creates lift 146 and forward thrust 143. Secondary Airflow 137 may be provided to the forward PAD 111 via the PAD Inlet 138, propelled through the PAD by EDR 123 and through the PAD inlet 113 as well to create additional lift 146 and forward thrust 143. The positioning of subsequent PADs above the preceding PAD 111 increases unblocked airflow, especially at increased forward airspeed, thereby increasing thrust as compared to PADs 111 located at the same height.

Figure 18A:
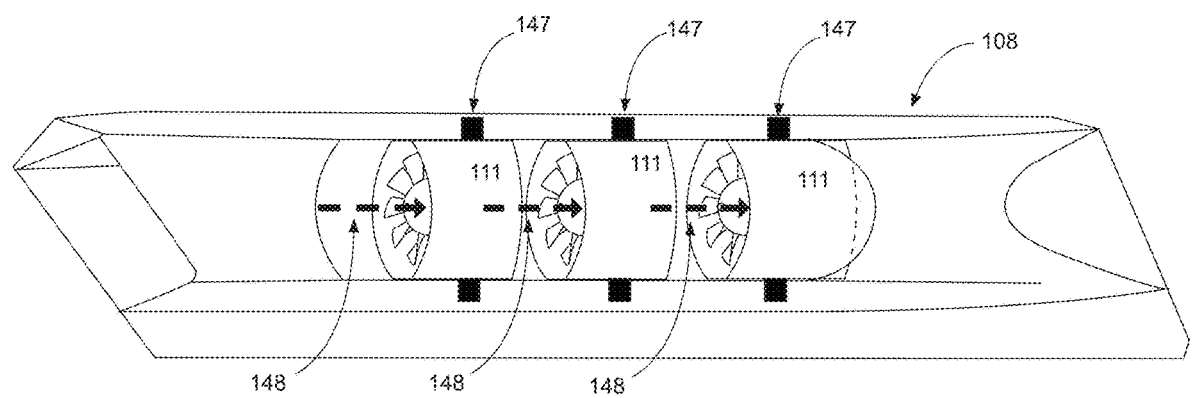
FIG. 18A shows an orthographic view of an exemplary Ducted Column Assembly from above with the front at the left of the figure. The PADs and Ventral Control Doors are positioned for transitional flight. Directional arrows show exemplary airflow acting upon the Ducted Column Assembly

FIG. 18A shows an orthographic view of a single Ducted Column Assembly 108 as seen from above with the front of the Ducted Column Assembly 108 on the left of the figure. The three PADs 111, are shown in the second position for transitional flight. When actuated, the PADs pivot on individual axes 147, in unison, in the pitch axis, creating an opening 148, between subsequent PADs 111, as well as the Ducted Column Assembly 108. The individual pivot 147 of each PAD 111 may be located in such a way that upon actuation, the leading edge of subsequent aft PADs 111 are physically above the leading edge of the preceding PAD when the exemplary embodiment aircraft 111 is top side up.

Figure 18B:
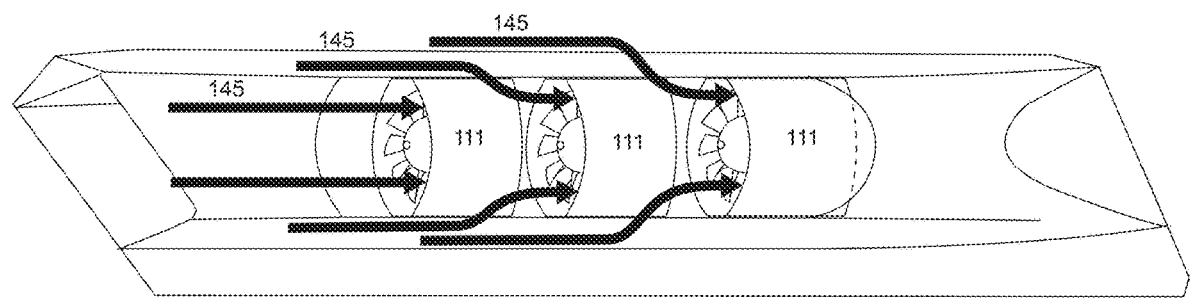
FIG. 18B shows an orthographic view of an exemplary Ducted Column Assembly from above with the front at the left of the figure. The PADs and Ventral Control Doors are positioned for transitional flight.

FIG. 18B shows secondary air flow 145 may be drawn into the subsequent PADs 111, e.g., $2^{nd}$ and $3^{rd}$, may draw air from the sides of the Ducted Column Assembly 108 in addition to air passing over the preceding PAD 111. Air being drawn in from the sides of the PAD 111 is made possible by the round contouring of the PADs, thereby increasing thrust compared to a PAD that may otherwise be designed with rectilinear outer form.

Figure 19A:
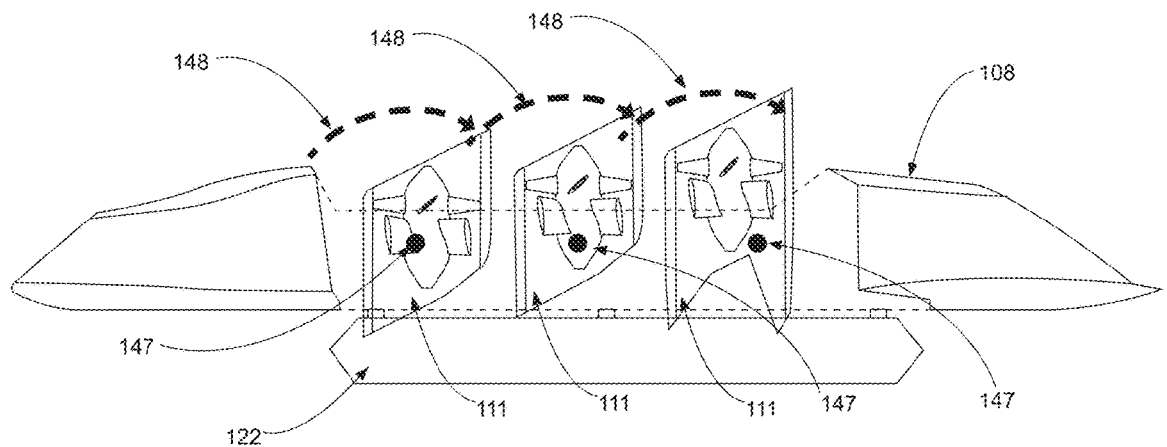
FIG. 19A shows an orthographic cutaway view of an exemplary Ducted Column Assembly from the left with the front at the left of the figure. The PADs and Ventral Control Doors are positioned for VTOL flight. Directional dashed arrows show directional rotation of the PAD from the first position to the third position.

FIG. 19A shows an orthographic cutaway of a single Ducted Column Assembly 108 as seen from the left with the front of the Ducted Column Assembly 108 on the left of the figure. The three PADs 111, are shown in the third position for VTOL flight. When actuated, The PADs 111 may be pivoted on individual axes 147, in unison, in the pitch axis, creating large openings 148 between subsequent PADs 111 and the Ducted Column Assembly 108. The individual pivot 147 of each PAD 111 may be located in such a way that upon actuation, the leading edge of subsequent aft PADs 111 are physically above the leading edge of the preceding PAD 111. The Ventral Control Door assembly 122 is shown open, in the third position, for VTOL flight. It will be noted that the second and third position of the Ventral Control Door may be the same.

Figure 19B:
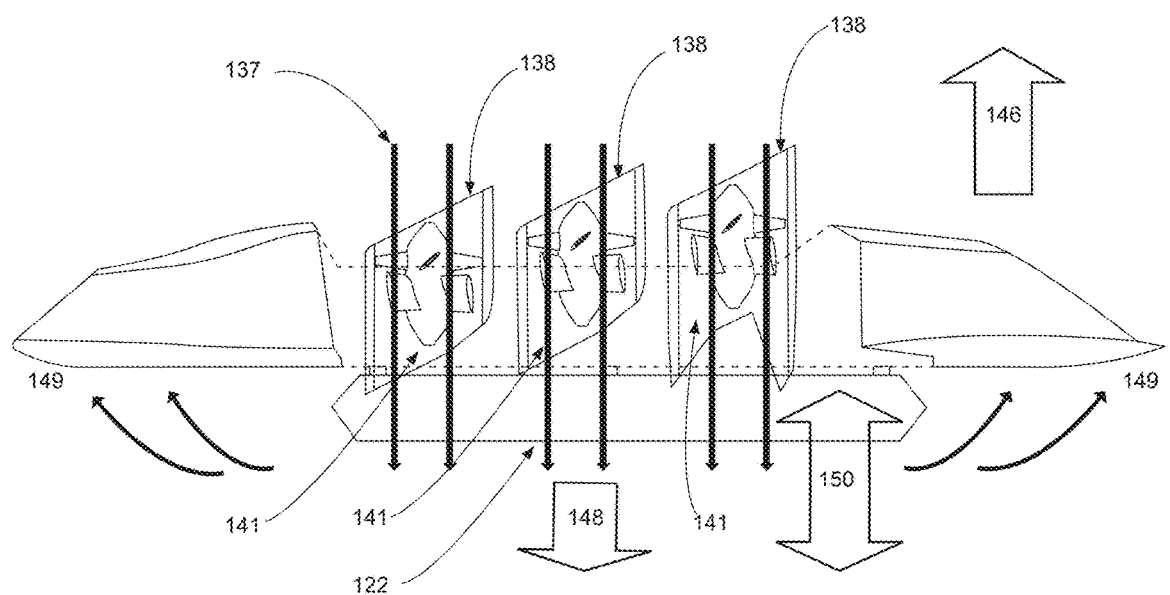
FIG. 19B shows an orthographic cutaway view of an exemplary Ducted Column Assembly from the left with the front at the left of the figure. The PADs and Ventral Control Doors are positioned for VTOL flight. Directional arrows show exemplary airflow as well as aerodynamic forces acting upon the Ducted Column Assembly

FIG. 19B shows the primary airflow 137 is drawn into each PAD 111 through inlet 138, and propelled by EDR 123 out through the PAD outlet 141 on a directional vector 148 that creates lift 146. The outer edges on the aircraft wing and lower fuselage 149 are generally configured to prevent reingestion of lift thrust by the PADs 111, for example, by making the outer edges of the aircraft wing and lower fuselage 149 substantially broader than the PADs 111. In addition, the outer edges on the aircraft wing and lower fuselage 149 may be configured to combine with the lateral obstruction provided by the Ventral Control Doors 122 and enhance aerodynamic ground effect 150, and therefore efficiency of lift thrust while in VTOL flight.

Figure 20:
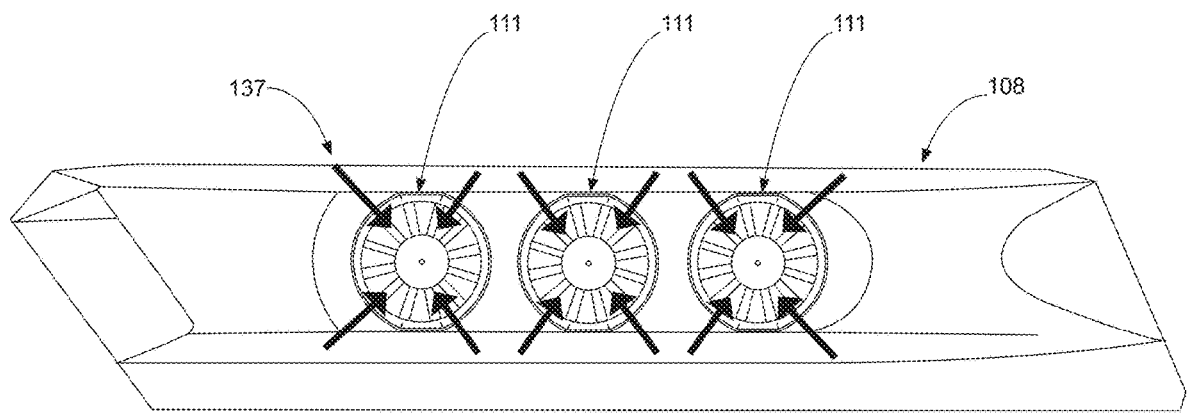
FIG. 20 shows an orthographic cutaway view of an exemplary Ducted Column Assembly from above with the front at the left of the figure. The PADs and Ventral Control Doors are positioned for VTOL. Directional arrows show exemplary airflow into the PADs.

FIG. 20 shows an orthographic cutaway of a single Ducted Column Assembly 108 as seen from above with the front of the Ducted Column Assembly 108 on the left of the figure. The three PADs 111, are shown in the third position for VTOL flight. FIG. 20 shows that during VTOL flight, primary airflow 137 is drawn into all PADs 111 omnidirectionally, without obstruction, thereby increasing thrust compared to PADs obstructed by other extra doors or other aircraft structures.

Figure 21A:
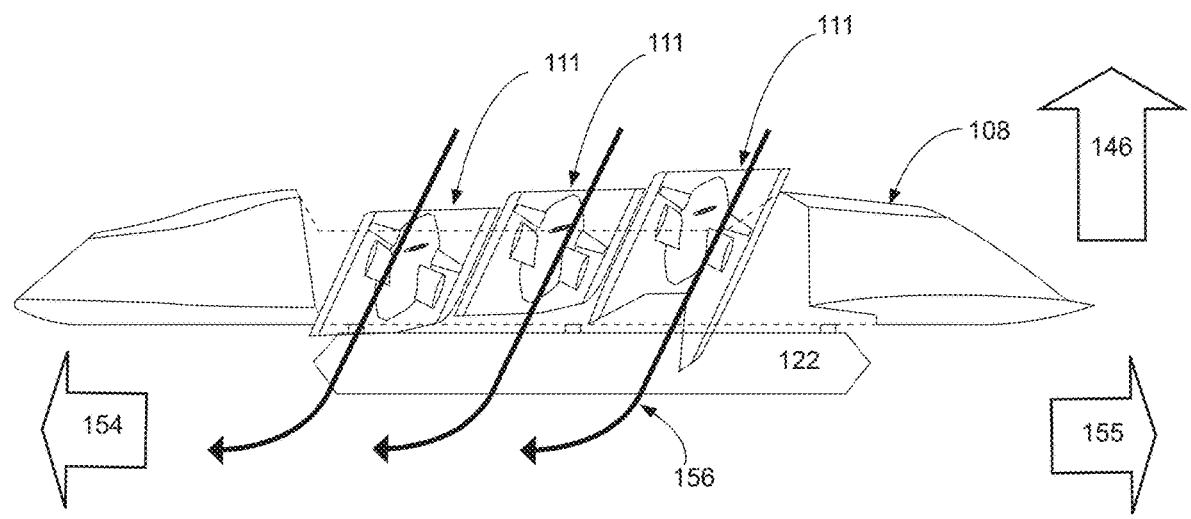
FIG. 21A shows an orthographic cutaway view of an exemplary Ducted Column Assembly above with the front at the left of the figure. The PADs and Ventral Control Doors are positioned in the fourth position for aft movement of the exemplary aircraft embodiment aircrafts while in VTOL

FIG. 21A shows an orthographic cutaway of a single Ducted Column Assembly 108 as seen from the left with the front of the Ducted Column Assembly 108 on the left of the figure. The Ventral Control Door assembly 122 is shown open, in the third position, for VTOL flight. The three PADs 111, are shown in a fourth position, for vectoring thrust 156 substantially downward to create lift 146, but also vectoring thrust slightly forward 154 for creating backward motion 155 for improving control during VTOL flight.

Figure 21B:
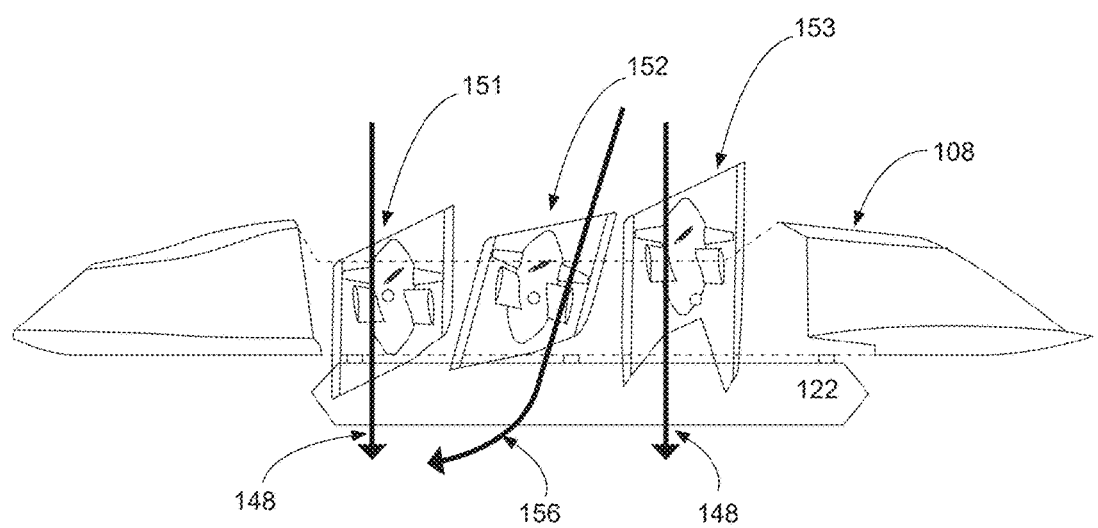
FIG. 21B shows an orthographic cutaway view of an exemplary Ducted Column Assembly from the left with the front at the left of the figure. The PADs and Ventral Control Doors are substantially positioned for VTOL. The center PAD is positioned to show greater pivot than the front and rear PADs.

FIG. 21B shows an orthographic cutaway of a single Ducted Column Assembly 108 as seen from the left with the front of the Ducted Column Assembly 108 on the left of the figure. The Ventral Control Door assembly 122 is shown open, in the third position, for VTOL flight. The first PAD 151 and third PAD 153, are shown in the third position, propelling thrust directly downward 148 for VTOL flight. The second PAD 152 is shown in the fourth position which vectors thrust 156 forward for improving aircraft control during VTOL flight. All PADs 111 may be configured to rotate in the pitch axis substantially at the same angle. In addition, the individual PADs 151-153 may be spaced to enable individual PADs to rotate at different angles, for the purpose of improving the performance of the individual PAD or aircraft 101, during transitional and VTOL flight.

Figure 22:
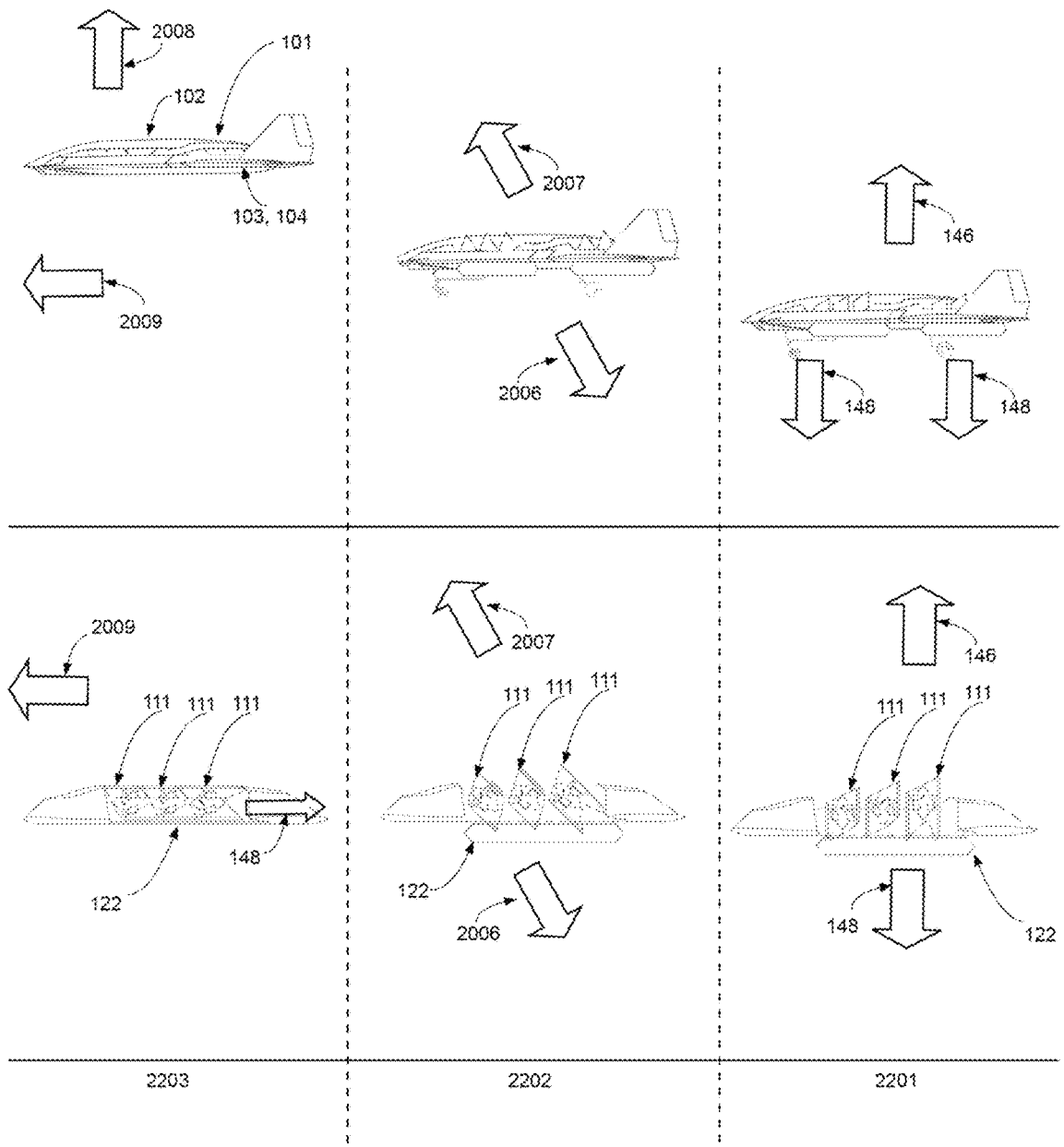
FIG. 22 shows an orthographic diagram as directly to the left side of exemplary aircraft embodiments transitioning from VTOL flight to forward flight.

FIG. 22 is an exemplary diagram about transitioning the exemplary embodiment aircraft from a hover to forward flight, as in a VTOL procedure. During hovering flight 2201, the PADs 111 are fully pivoted to the third position for VTOL flight, to direct thrust 148 perpendicular to the ground to cause lift 146 of the entire aircraft 101. The Ventral Control Door assemblies are open in the third position for VTOL flight. To change from hovering flight 2201 to transitional flight 2202 to forward flight 2203, the PADs 111 are pivoted to the second position for transitional flight, to direct thrust partially perpendicular to the ground and partially to the rear 2006 to cause motion that is upward as well as forward 2007. At sufficient airspeed, the wing assemblies 103,104 and fuselage 102, start producing aerodynamic lift 2008, and the PADs are pivoted to the first position for forward flight 2009. In forward flight 2203, the PADs 111 direct thrust 148 directly to the rear to propel the aircraft 101 forward. At sufficient forward airspeed, the wings 103,104 and fuselage 102 are generating all of the necessary lift for flight by dynamic lift. In forward flight, the Ventral Control Doors 122 are closed in the first position, for forward flight.

Figure 23A:
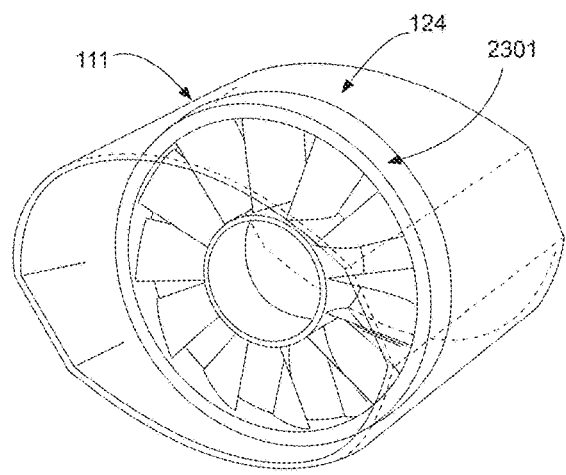
FIG. 23A shows a perspective view of an exemplary embodiment of a Rim-Driven Ducted Rotor installed in a PAD.
Figure 23B:
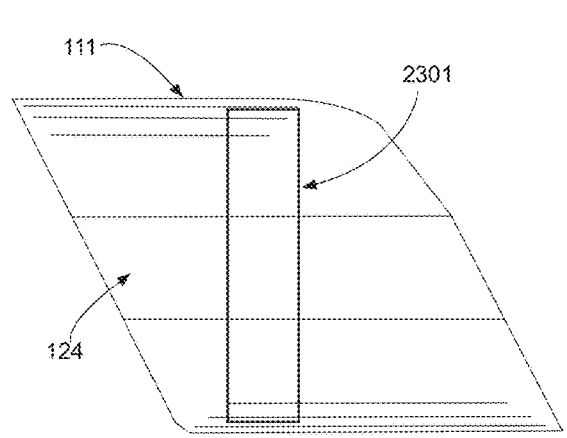
FIG. 23B shows an orthographic view directly from the left side of an exemplary Rim-Driven Ducted Rotor installed in a PAD.
Figure 23C:
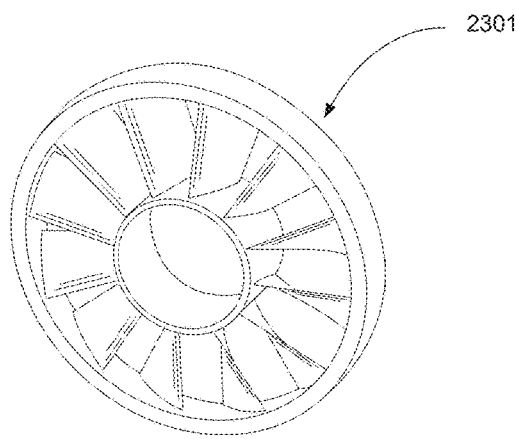
FIG. 23C shows a perspective view of an exemplary Rim-Driven Ducted Rotor.
Figure 23D:
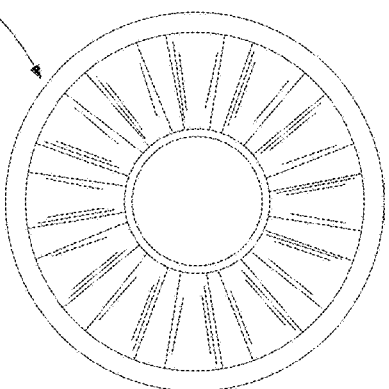
FIG. 23D shows an orthographic view directly from the front of an exemplary Rim-Driven Ducted Rotor.

FIG. 23A is a perspective cutaway view as seen from the front left of a single PAD 111, showing the outer structure of the PAD 124, with an exemplary electrically Rim-Driven Rotor 2301 installed in the center. FIG. 23B is an orthographic cutaway view as seen from the left of a single PAD 111, showing the outer structure of the PAD 124, with an exemplary electrically Rim-Driven Rotor 2301 installed in the center. FIG. 23C is a perspective view as seen from the front left, of an exemplary Rim-Driven Rotor. FIG. 23D is an orthographic view as seen from the front left, of an exemplary Rim-Driven Rotor. Although the present invention has been illustrated and described herein with reference to embodiment and specific example of Axial-Driven Electric Ducted Rotors, it will be readily apparent to those of ordinary skill in the art that various embodiments of the aircraft 101 of the present invention may include Rim-Driven Rotors 2301.

Figure 24A:
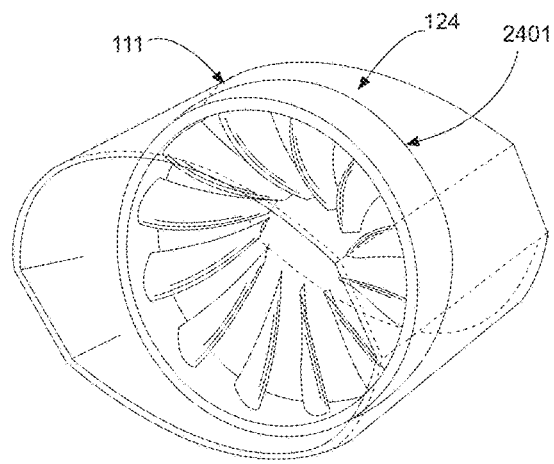
FIG. 24A shows a perspective view of an exemplary embodiment of a Rim-Driven Hubless Ducted Rotor installed in a PAD.
Figure 24B:
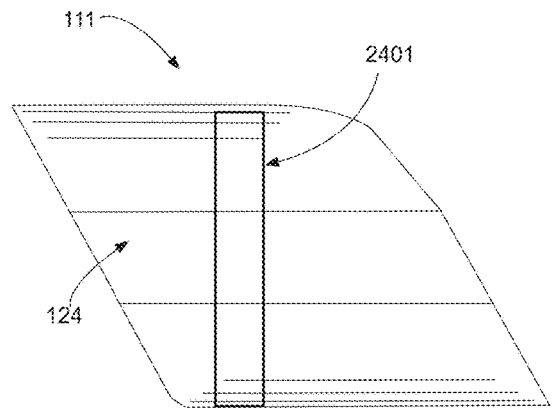
FIG. 24B shows an orthographic view directly from the left side of an exemplary Rim-Driven Hubless Ducted Rotor installed in a PAD.
Figure 24C:
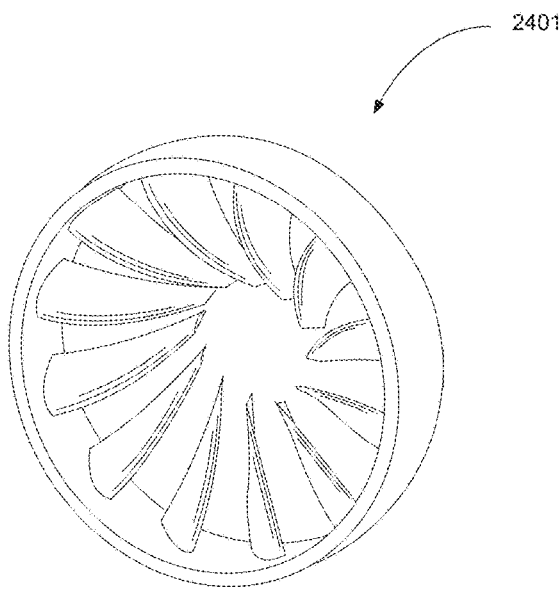
FIG. 24C shows a perspective view of an exemplary Rim-Driven Hubless Ducted Rotor.
Figure 24D:
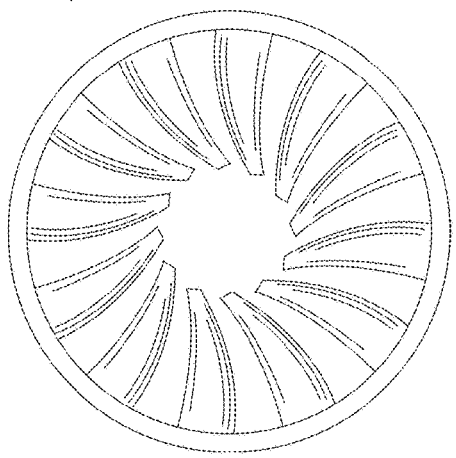
FIG. 24D shows an orthographic view directly from the front of an exemplary Rim-Driven Hubles Ducted Rotor.

FIG. 24A is a perspective cutaway view as seen from the front left of a single PAD 111, showing the outer structure of the PAD 124, with an exemplary electrically Rim-Driven Hubless Rotor 2401 installed in the center. FIG. 23B is an orthographic cutaway view as seen from the left of a single PAD 111, showing the outer structure of the PAD 124, with an exemplary electrically Rim-Driven Hubless Rotor 2401 installed in the center. FIG. 24C is a perspective view as seen from the front left, of an exemplary Rim-Driven Hubless Rotor. FIG. 23D is an orthographic view as seen from the front left, of an exemplary Rim-Driven Hubless Rotor. Although the present invention has been illustrated and described herein with reference to embodiment and specific example of Axial-Driven Electric Ducted Rotors, it will be readily apparent to those of ordinary skill in the art that various embodiments of the aircraft 101 of the present invention may include Rim-Driven Rotors 2301.

FIGS. 25-28 show how a flight control system coordinates and individually activates PADs 111, EDRs 123, and Ventral Control Door assemblies, 122, to control various propulsion. This description does not describe every aspect of the control system, or possible combinations or techniques applied to other embodiments.

Figure 25A:
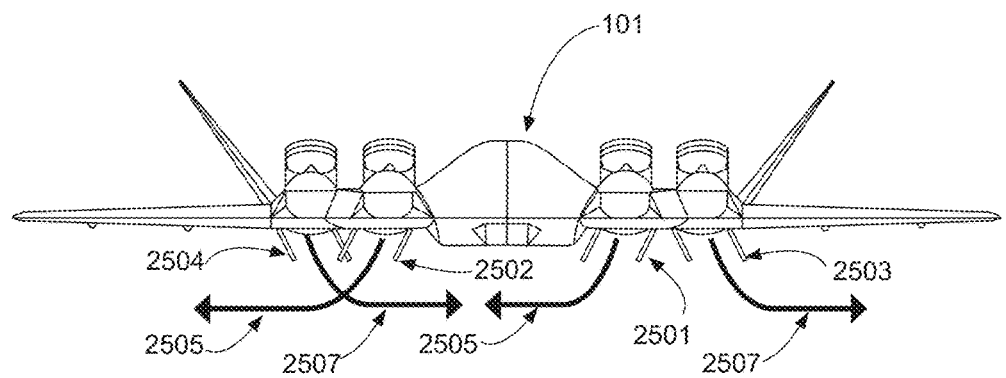
FIG. 25A shows an orthographic view of exemplary aircraft embodiments as viewed from directly from the front. PADs are configured in the third position for VTOL flight.
Figure 25B:
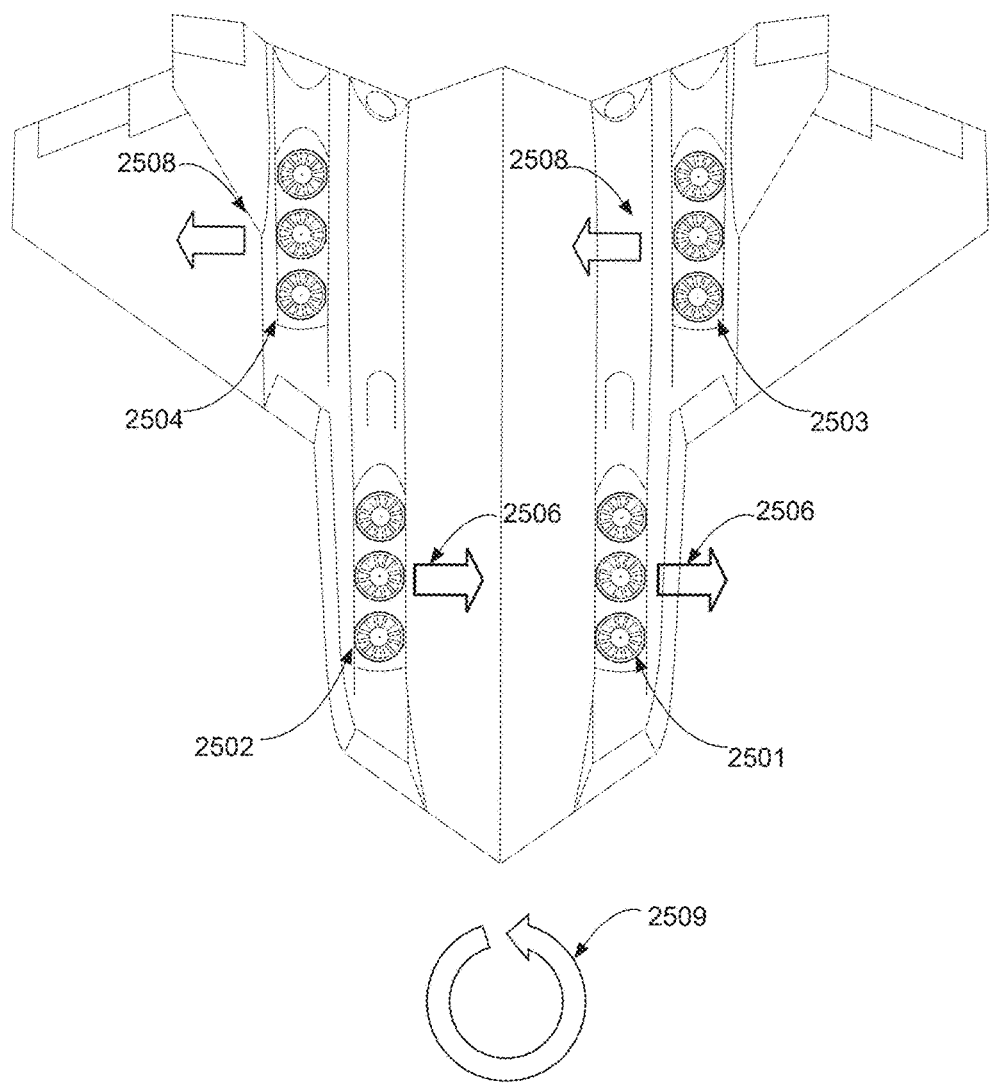
FIG. 25B shows an orthographic view of exemplary aircraft embodiments as viewed from directly above with the front at the bottom of the figure. PADs are configured for in the third position for VTOL flight. The circular directional graphic arrow at the bottom of the figure indicates exemplary aircraft embodiments motion of yaw.

FIG. 25A-FIG. 25B are an exemplary diagram showing how the Ventral Control Door assemblies 2501-2504 may be used to assist in controlling the clockwise and counterclockwise motion primarily in the yaw axis of the aircraft 101 when in position 3, VTOL Flight. FIG. 25A shows an orthographic front view of the aircraft 101. FIG. 25B shows an orthographic view of aircraft 101 viewed from directly above. Ventral Control Door Assemblies 2501, 2502 may be configured to deflect a portion of the airflow to, and thus the thrust to, the right 2505 of the aircraft, causing motion of the front portion of the aircraft in the left 2506 direction. Ventral Control Door Assemblies 2503, 2504 deflect a portion of the airflow, and thus the thrust to, the left 2507 of the aircraft, causing motion of the aft portion of the aircraft in the right direction 2508. The combined deflection of thrust causes a counterclockwise motion 2509. An opposite deflection of the airflow by the Ventral Control Door assemblies causes a clockwise motion.

Figure 26A:
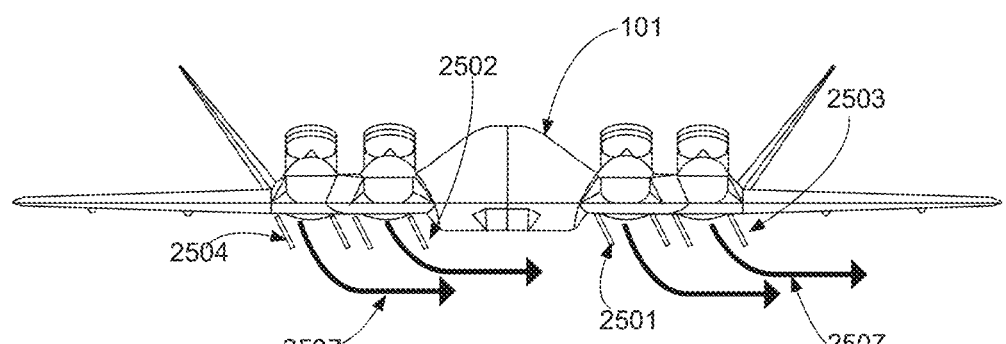
FIG. 26A shows an orthographic view of exemplary aircraft embodiments as viewed from directly from the front. PADs are configured in the third position for VTOL flight.
Figure 26B:
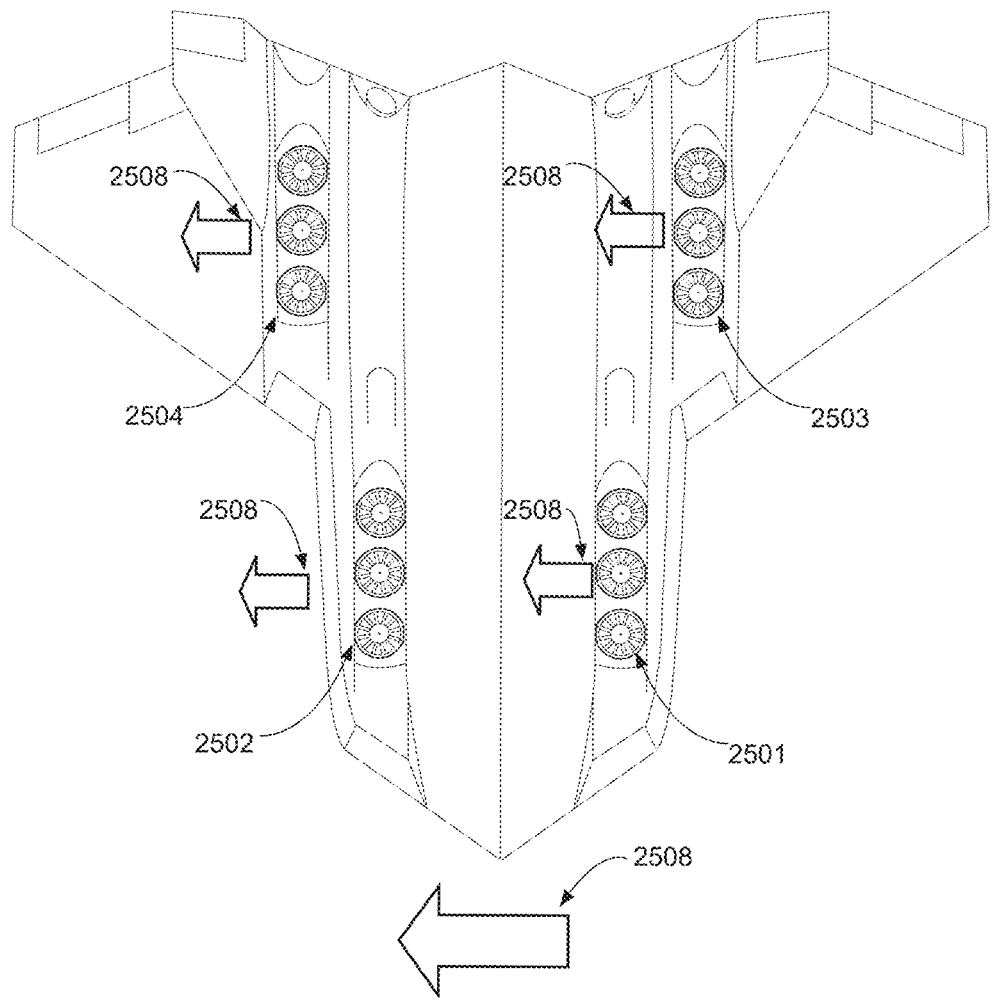
FIG. 26B shows an orthographic view of exemplary aircraft embodiments as viewed from directly above with the front at the bottom of the figure. PADs are configured for VTOL flight. The directional graphic arrow at the bottom of the figure indicates exemplary aircraft embodiments motion of left-to-right translation.

FIG. 26A-FIG. 26B are an exemplary diagram showing how the Ventral Control Doors Assemblies 2501-2504 may be used to assist in controlling the left and right motion of the aircraft 101 when in position three, VTOL Flight. FIG. 26A shows an orthographic front view of an exemplary aircraft. FIG. 26B shows an orthographic view of aircraft 101 viewed from directly above. Ventral Control Door Assemblies 2501-2504 deflect a portion of airflow, i.e., thrust, to the left 2507 of the aircraft 101, causing a non-rotating motion of the aircraft 101 in the right 2508 direction. An opposite deflection of the airflow by the Ventral Control Door assemblies causes a motion in the left direction.

Figure 27A:
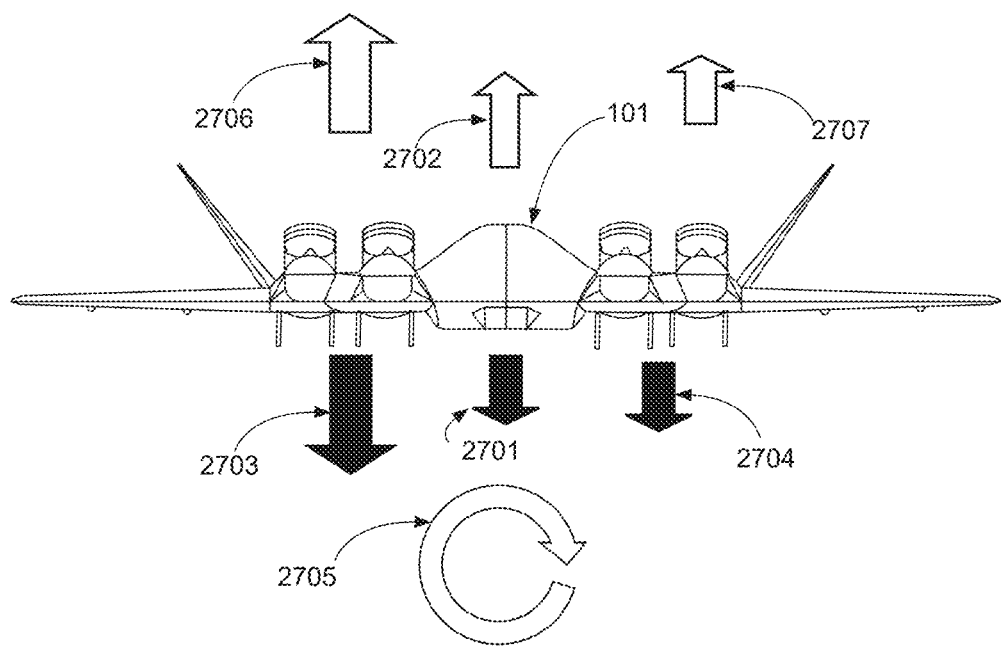
FIG. 27A shows an orthographic view of exemplary aircraft embodiments as viewed from directly from the front PADs are configured in the third position for VTOL flight.
Figure 27B:
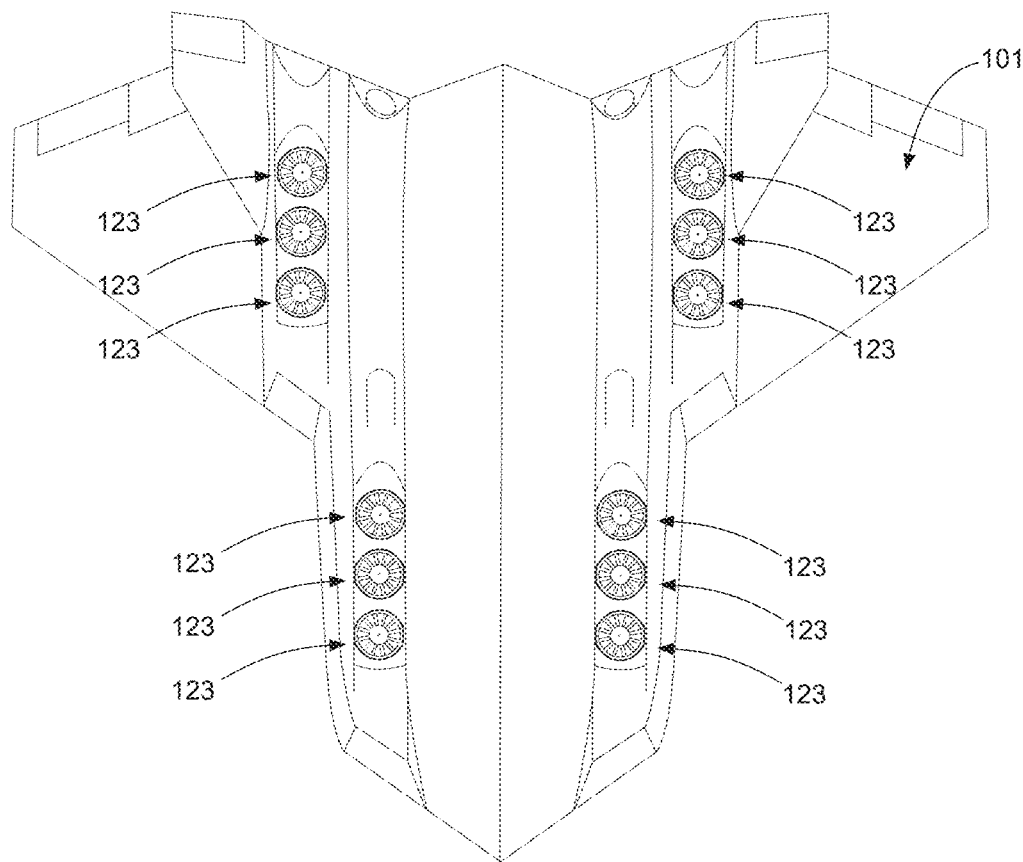
FIG. 27B shows an orthographic view of exemplary aircraft embodiments as viewed from directly above with the front at the bottom of the figure.

FIG. 27A-FIG. 27B is an exemplary diagram about controlling roll with differential thrust in VTOL flight. FIG. 27A shows an orthographic front view of view of the aircraft 101 in the third position for VTOL flight. FIG. 27B shows an orthographic view of the aircraft 101 aircraft in the third position for VTOL flight from directly above. In VTOL flight, the primary purpose of the EDRs 123, is to produce thrust 2701 which is directed perpendicular to the ground to produce lift 2702. For roll controllability in VTOL, applying more thrust 2703 on the right side of the aircraft 101 creates more lift on the right side 2706 and applying less thrust on the left side 2704 causes less lift on the left side 2707, which causes a clockwise roll moment 2705 as seen from the front of the aircraft 101, or vice versa for causing a counterclockwise roll.

Figure 28A:
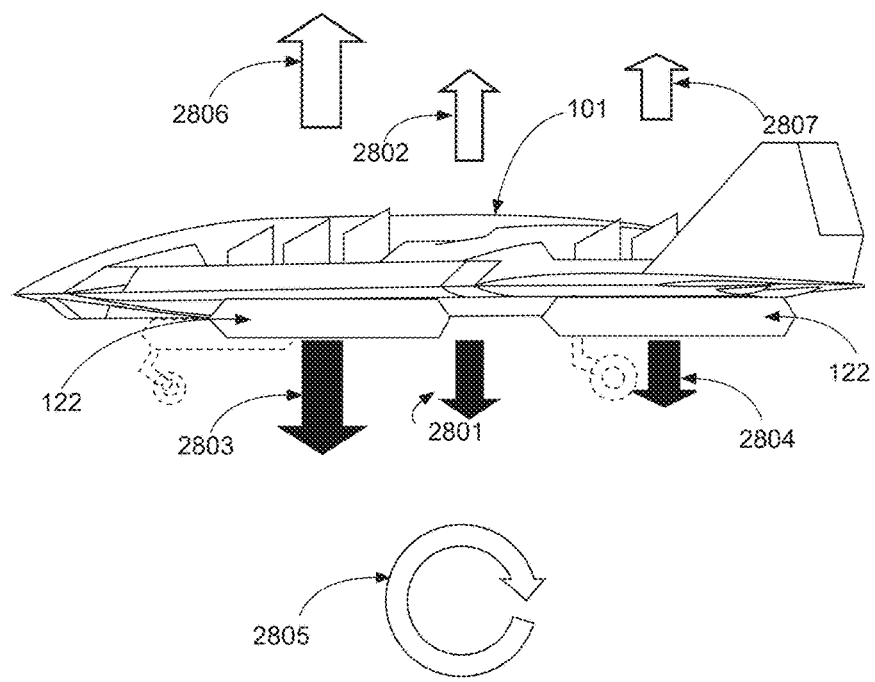
FIG. 28A shows an orthographic view of exemplary aircraft embodiments as viewed from directly from the left side. PADs are configured in the third position for VTOL flight. The directional graphic arrow at the bottom of the figure indicates exemplary aircraft embodiments motion of pitch.
Figure 28B:
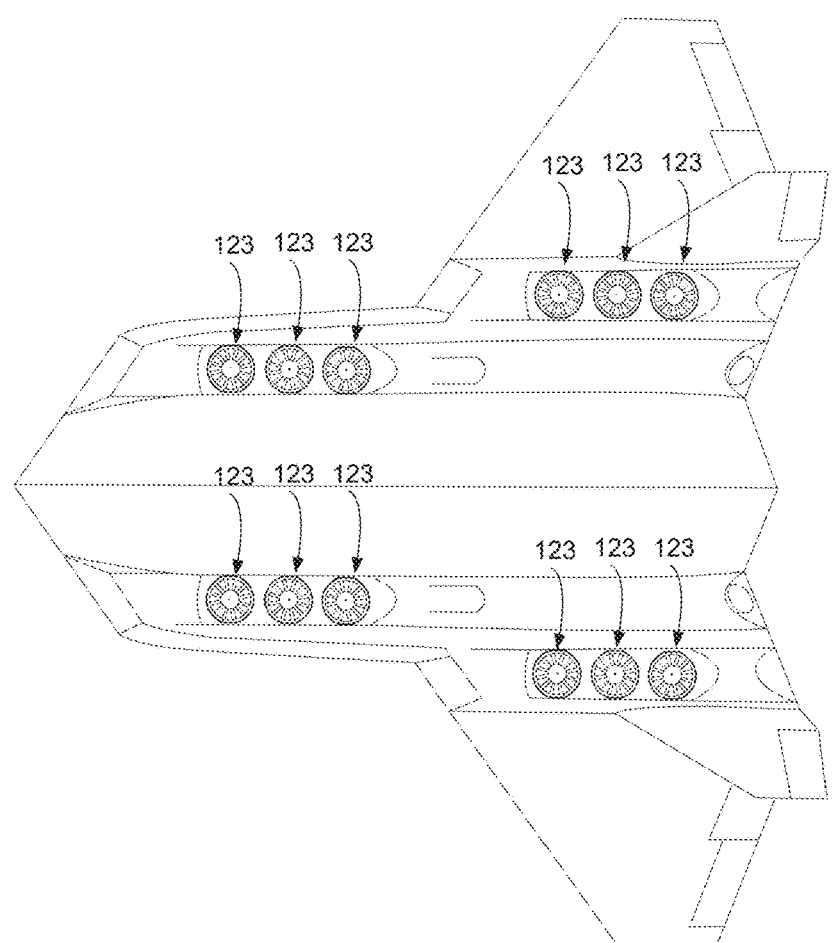
FIG. 28B shows an orthographic view of exemplary aircraft embodiments as viewed from directly from above. PADs are configured for VTOL flight.

FIG. 28A-FIG. 28B is an exemplary diagram about controlling pitch with differential thrust in VTOL flight. FIG. 28A shows an orthographic view of aircraft 101, in the third position for VTOL flight, as seen from the left side. Ventral Control Door assemblies 122, are shown in the second position for VTOL flight. FIG. 28B shows an orthographic view of aircraft 101 aircraft in the third position for VTOL flight from directly above. In VTOL flight, the primary purpose of the EDRs 123, is to produce thrust 2801 which is directed perpendicular to the ground to produce lift 2802. For roll controllability in VTOL, applying more thrust on the front of the aircraft 2803 creates more lift on the front 2806 and applying less thrust less at aft 2804 causes less lift on the left side 2807, which causes a clockwise pitch moment 2805 as seen from the left side of the aircraft 101, or vice versa for causing a counterclockwise roll.

Figure 29:
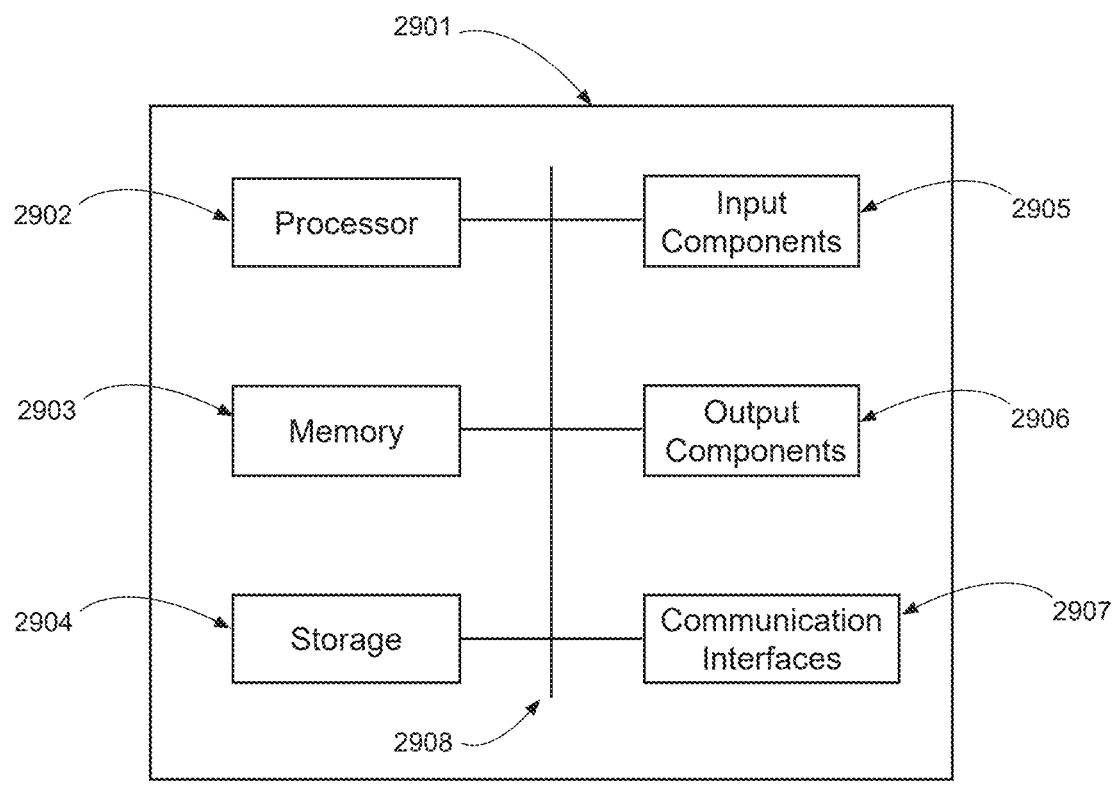
FIG. 29 depicts exemplary computing resources that may be employed in various aircraft embodiments.

FIG. 29 illustrates exemplary component embodiments of various computing resources 2901 that may be employed in the aircraft 101 to control operations, communications, etc. The computing resources 2901 may each include one or more processors 2902, memory 2903, storage 2904, input components 2905, output components 2906, communication interfaces 2907, as well as other components that may be interconnected as desired by the skilled artisan via one or more buses 2908. As previously described, the components of the various computing resources 2901 may often be configured as a single device or multiple interdependent or stand-alone devices in close proximity and/or distributed throughout the aircraft 101.

Processor(s) 2902 may include one or more general or Central Processing Units ("CPU"), Graphics Processing Units ("GPU"), Accelerated Processing Units ("APU"), microprocessors, and/or any processing components, such as a Field-Programmable Gate Arrays ("FPGA"), Application-Specific Integrated Circuits ("ASIC"), etc. that interpret and/or execute logical functions. The processors 2902 may contain cache memory units for temporary local storage of instructions, data, or computer addresses and may be implemented as a single-chip, multiple chips and/or other electrical components including one or more integrated circuits and printed circuit boards that implements and executes logic in hardware, in addition to executing software.

Processor(s) 2902 may connect to other computer systems and/or to telecommunications networks as part of performing one or more steps of one or more processes described or illustrated herein, according to particular needs. Moreover, one or more steps of one or more processes described or illustrated herein may execute solely at the processor 2902. In addition, or as an alternative, one or more steps of one or more processes described or illustrated herein for execution in one processor may be executed at multiple CPUs that are local or remote from each other across one or more networks.

The computing resources 2901 may implement processes employing hardware and/or software to provide functionality via hardwired logic or otherwise embodied in circuits, such as integrated circuits, which may operate in place of or together with software to execute one or more processes or one or more steps of one or more processes described or illustrated herein. Software implementing particular embodiments may be written in any suitable programming language (e.g., procedural, object oriented, etc.) or combination of programming languages, where appropriate.

The computing resources 2901 may implement processes employing software to provide an embodiment of artificial intelligence, which may operate in place of or together with software to store experiential data from the Input Components 2205, independently process the data in the processor 2902, and use the results to improve performance against human provided criteria for performance. Improved performance may be conveyed though Output Components 2206 and evident in embodiments such as the efficiency of the propulsion system, in the reaction time of the flight controls, the reliability of the communications interfaces, or safe interactivity with other nearby objects or aircrafts.

Memory 2903 may include Random Access Memory ("RAM"), Read Only Memory ("ROM"), and/or another type of dynamic or static storage device, such as flash, magnetic, and optical memory, etc. that stores information and/or instructions for use by processor 2902. The memory 2903 may include one or more memory cards that may be loaded on a temporary or permanent basis. Memory 2903 and storage 2904 may include a Subscriber Identification Module ("SIM") card and reader.

Storage components 2904 may store information, instructions, and/or software related to the operation of the aircraft 101 and computing resources 2901. Storage 2904 may be used to store operating system, executables, data, applications, and the like, and may include fast access primary storage, as well as slower access secondary storage, which may be virtual or fixed.

Storage component(s) 2904 may include one or more transitory and/or non-transitory computer-readable media that store or otherwise embody software instructions, etc. implementing particular embodiments. The computer-readable medium may be any tangible medium capable of carrying, communicating, containing, holding, maintaining, propagating, retaining, storing, transmitting, transporting, or otherwise embodying software, where appropriate, including nano-scale medium. The computer-readable medium may be a biological, chemical, electronic, electromagnetic, infrared, magnetic, optical, quantum, or other suitable medium or a combination of two or more such media, where appropriate. Example computer-readable media include, but are not limited to fixed and removable drives, ASIC, Compact Disks ("CDs"), Digital Video Disks ("DVDs", FPGAs, floppy disks, optical and magneto-optic disks, hard disks, holographic storage devices, magnetic tape, caches, Programmable Logic Devices ("PLDs"), RAM devices, ROM devices, semiconductor memory devices, solid state drives, cartridges, and other suitable computer-readable media.

Input components 2905 and output components 2906 may include various types of Input/Output ("I/O") devices. The I/O devices often may include a Graphical User Interface ("GUI") that provides an easy to use visual interface between the operator(s) and the aircraft 101 and access to the operating system or application(s) running on the aircraft 101 and/or aircraft control systems external to the aircraft 101.

Input components 2905 receive any type of input in various forms from users or other machines, such as touch screen and video displays, keyboards, keypads, mice, buttons, track balls, switches, joy sticks, directional pads, microphones, cameras, transducers, card readers, voice and handwriting inputs, and sensors for sensing information such as biometrics, temperature, other aircraft & other environmental conditions, such as air quality, etc., location via Global Positioning System ("GPS") or otherwise, accelerometer, gyroscope, compass, actuator data, which may be input via a user or received via one or more communication interfaces 3507.

Output component 2906 may include displays, speakers, lights, sensor information, mechanical, or other electromagnetic output. Similar to the input, the output may be provided via one or more ports and/or one or more communication interfaces 2907.

Communication interface 2907 may include one or more transceivers, receivers, transmitters, modulators, demodulators that enable communication, via wired and/or wireless connections onboard and remote from the aircraft 101. Communication interfaces 3507 may include Ethernet, optical, coaxial, Universal Serial Bus ("USB"), Infrared ("IR"), Radio Frequency ("RF") including the various Wi-Fi, WiMax, cellular, and Bluetooth protocols, such as Bluetooth, Bluetooth Low Energy (BLE), Wi-Fi (IEEE 802.11), Wi-Fi Direct, SuperWiFi, 802.15.4, WiMax, LTE systems, LTE Direct, past, current, and future cellular standard protocols, e.g., 4-5G, Satellite or other wireless signal protocols or technologies as described herein and known in the art.

Bus(es) 2908 may connect a wide variety of other subsystems, in addition to those depicted, and may include various other components that permit communication among the components in the computing resources 2901. The bus(es) 2908 may encompass one or more digital signal lines serving a common function, where appropriate, and various structures including memory, peripheral, or local buses using a variety of bus architectures. As an example and not by way of limitation, such architectures include an Industry Standard Architecture ("ISA") bus, an Enhanced ISA ("EISA") bus, a Micro Channel Architecture ("MCA") bus, a Video Electronics Standards Association Local Bus ("VLB"), a Peripheral Component Interconnect ("PCI") bus, a PCI-eXtended ("PCI-X") bus, a Peripheral Component Interconnect Express (PCIe) bus, a Controller Area Network ("CAN") bus, and an Accelerated Graphics Port ("AGP") bus.

The computing resources 2901 may provide functionality as a result of the processors 2202 executing software embodied in one or more computer-readable storage media residing in the memory 2903 and/or storage 2904 and logic implemented and executed in hardware. The results of executing the software and logic may be stored in the memory 2903 and/or storage 2904, provided to output components 2906, and transmitted to other devices via communication interfaces 2907, which includes cloud storage and cloud computing. In execution, the processor 2902 may use various inputs received from the input components 2905 and/or the communications interfaces 2907. The input may be provided directly to the processor 2902 via the bus 2908 and/or stored before being provided to the processor 2202. Executing software may involve carrying out processes or steps may include defining data structures stored in memory 2903 and modifying the data structures as directed by the software.

It is to be understood that the foregoing embodiments are exemplary, and that the technology is NOT limited to only the embodiment or scale disclosed herein. Equivalent variations not hitherto disclosed are to be under-stood as remaining within the scope and the spirit of the claims below Although the present invention has been illustrated and described herein with reference to embodiment and specific example thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:
1. An aircraft comprising:
 a fuselage having a forward and aft direction and including a power system;
 at least a first right wing attached to the fuselage;

at least a first left wing attached to the fuselage symmetrically opposed to the right wing;
the first right wing and first left wing including a plurality of pivoting angled ducts aligned in a longitudinal ducted column assembly, with forward and aft angled faces, and configured to operate as a single ducted column in a first position, and as separate unitary ducts when in second, third, and fourth positions,
each pivoting angled ducts including a fixedly positioned rotor to draw air through an inlet into the pivoting angled ducts and propel air out an outlet of the pivoting angled ducts when powered by the power system, and
a pivoting lateral axle on the pivoting angled ducts to position the ducts;
in the first position to direct propelled air to provide forward thrust and vertical dynamic lift,
in a second position in pitch axis to direct propelled air to provide partially forward thrust and provide partially vertical lift,
in a third position to direct propelled air to provide lift and provide control in pitch and roll in the third position of Vertical Takeoff and Landing Flight; and
in a fourth position to direct propelled air to provide lift and provide aft movement during Vertical Takeoff and Landing Flight; and
ventrally control doors located under the plurality of pivoting angled ducts, to provide streamlining of the aircraft in the first position, and yaw and left to right control when in the second, third position and fourth position.

2. The aircraft of claim 1, further comprising: at least one processor to control the rotation of the rotors and the movement of the pivoting angled ducts and control doors to enable flight of the aircraft.

3. The aircraft of claim 2, where the processor communicates with at least one control device to communicate instructions and data.

4. The aircraft of claim 1, where the ducted column assemblies include forward and aft ducted column assemblies separated by a left to right distance and a forward to aft distance.

5. The aircraft of claim 1, where the power system is an electrical power system, and the rotors are electrically driven by power from the electrical power system.

6. The aircraft of claim 5, where
the electrical power system includes at least one of a battery and a hydrocarbon-fueled power generator, or a hydrogen fuel-cell.

7. The aircraft of claim 1, where
the first right and left wings and pivoting angled ducts are constructed primarily from at least one of carbon fiber material, composite structures, thermoform plastics, and or metal.

8. The aircraft of claim 1, where
the first right and left wings each include at least three pivoting angled ducts.

9. The aircraft of claim 1, where
the first right and left wings include less than twenty pivoting angled ducts.

10. The aircraft of claim 1, where
the pivoting angled ducts are positioned at a zero angle relative to horizontal in the forward-aft direction in the first position.

11. The aircraft of claim 10, where
the rotors are positioned at a 45 degree angle relative to horizontal in the forward-aft direction in the second position.

12. The aircraft of claim 10, where
the rotors are positioned at a vertical 90 degree angle relative to horizontal position in the third position.

13. The aircraft of claim 10, where
the rotors are positioned at a vertical 110 degree angle relative to horizontal position in the fourth position.

14. The aircraft of claim 1, further comprising:
one of landing gear to support runway take-off and landing.

15. The aircraft of claim 1, where
the fuselage is configured to carry at least one person.

16. The aircraft of claim 1, where
the first right wing and first left wing each including a plurality of pivoting angled ducts aligned in at least two longitudinal ducted column assemblies.

17. The aircraft of claim 1, where
the pivoting angled ducts are configured in the ducted column assemblies to provide a secondary air flow to successive pivoting angled ducts in the first position.

18. The aircraft of claim 1, where
the first right wing and first left wing each include one longitudinal ducted column assembly including three pivoting angled ducts.

19. A method of propelling an aircraft comprising:
providing an aircraft having
a fuselage having a forward and aft direction and including a power system;
at least a first right wing attached to the fuselage;
at least a first left wing attached to the fuselage symmetrically opposed to the right wing;
the first right wing and first left wing including a plurality of pivoting angled ducts aligned in a longitudinal ducted column assembly, with forward and aft angled faces, and configured to operate as a single ducted column in a first position, and as separate unitary ducts when in second, third, and fourth positions,
each pivoting angled ducts including a fixedly positioned rotor to draw air through an inlet into the pivoting angled ducts and propel air out an outlet of the pivoting angled ducts when powered by the power system, and
a pivoting lateral axle on the pivoting angled ducts to position the pivoting angled ducts, and
ventrally control doors located under the plurality of ducts; and
positioning pivoting angled ducts
in the first position to direct propelled air to provide forward thrust and vertical dynamic lift,
in a second position in pitch axis to direct propelled air to provide partially forward thrust and provide partially vertical lift,
in a third position to direct propelled air to provide lift and provide control in pitch and roll in the third position of Vertical Takeoff and Landing Flight; and
in a fourth position to direct propelled air to provide lift and provide aft movement during Vertical Takeoff and Landing Flight; and
positioning the ventrally control doors to provide streamlining of the aircraft in the first position, and yaw and left to right control when in the second, third position and fourth position.

20. The method of claim 19, where the first right wing and first left wing each include two longitudinal ducted column assemblies each including three pivoting angled ducts.

* * * * *